United States Patent
Hwang et al.

(10) Patent No.: US 10,791,541 B2
(45) Date of Patent: Sep. 29, 2020

(54) METHOD FOR PERFORMING RANDOM ACCESS AND TERMINAL FOR PERFORMING SAME

(71) Applicant: LG ELECTRONICS INC., Seoul (KR)

(72) Inventors: Seunggye Hwang, Seoul (KR); Yunjung Yi, Seoul (KR); Kijun Kim, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/312,979

(22) PCT Filed: Jun. 22, 2017

(86) PCT No.: PCT/KR2017/006613
§ 371 (c)(1),
(2) Date: Dec. 21, 2018

(87) PCT Pub. No.: WO2017/222327
PCT Pub. Date: Dec. 28, 2017

(65) Prior Publication Data
US 2019/0223157 A1    Jul. 18, 2019

Related U.S. Application Data

(60) Provisional application No. 62/353,533, filed on Jun. 22, 2016, provisional application No. 62/429,083, filed on Dec. 2, 2016.

(51) Int. Cl.
*H04W 72/02* (2009.01)
*H04L 27/26* (2006.01)
(Continued)

(52) U.S. Cl.
CPC ......... *H04W 72/02* (2013.01); *H04L 27/2602* (2013.01); *H04L 27/2607* (2013.01);
(Continued)

(58) Field of Classification Search
CPC ... H04W 72/00; H04W 72/02; H04W 72/042; H04W 72/048; H04W 74/0833;
(Continued)

(56) References Cited

U.S. PATENT DOCUMENTS

2015/0365977 A1    12/2015    Tabet et al.
2016/0150570 A1     5/2016    Wang et al.
(Continued)

OTHER PUBLICATIONS

PCT International Application No. PCT/KR2017/006613, International Search Report dated Sep. 20, 2017, 4 pages.
(Continued)

*Primary Examiner* — Warner Wong
(74) *Attorney, Agent, or Firm* — Lee, Hong, Degerman, Kang & Waimey

(57) ABSTRACT

A disclosure of the present specification provides a method for performing random access by a terminal. The method may comprise the steps of: selecting, by the terminal, a first resource among a plurality of resources for a physical random access channel (PRACH), wherein the plurality of resources exist for each numerology, and the numerology is defined by a cycle prefix (CP) length and a subcarrier spacing; and transmitting, by the terminal, the PRACH on the first resource through a first numerology when the selected first resource is for the first numerology.

9 Claims, 21 Drawing Sheets

(51) Int. Cl.
*H04W 72/04* (2009.01)
*H04W 74/08* (2009.01)
*H04L 29/08* (2006.01)
*H04L 12/24* (2006.01)
*H04L 29/06* (2006.01)
*H04W 76/10* (2018.01)
*H04L 5/00* (2006.01)

(52) U.S. Cl.
CPC ..... *H04W 72/042* (2013.01); *H04W 74/0833* (2013.01); *H04L 5/0007* (2013.01); *H04L 29/06326* (2013.01); *H04L 29/08585* (2013.01); *H04L 41/0803* (2013.01); *H04L 41/0806* (2013.01); *H04L 67/141* (2013.01); *H04W 72/048* (2013.01); *H04W 76/10* (2018.02)

(58) Field of Classification Search
CPC ... H04W 74/008; H04W 74/00; H04W 74/08; H04W 76/10; H04W 5/0007; H04L 12/413; H04L 27/2607; H04L 29/06326; H04L 29/08585; H04L 67/141; H04L 41/08; H04L 41/0803; H04L 41/0806; H04L 65/1061; H04L 65/1065
See application file for complete search history.

(56) References Cited

U.S. PATENT DOCUMENTS

| 2018/0132282 | A1* | 5/2018 | Ly | H04W 48/12 |
| 2018/0152907 | A1* | 5/2018 | Zhang | H04W 74/006 |
| 2019/0174513 | A1* | 6/2019 | Loehr | H04W 72/14 |
| 2019/0174531 | A1* | 6/2019 | Takeda | H04W 72/0446 |
| 2019/0364520 | A1* | 11/2019 | Kazmi | H04W 8/22 |
| 2019/0373644 | A1* | 12/2019 | Wang | H04L 5/0007 |
| 2020/0015284 | A1* | 1/2020 | Liu | H04W 74/0833 |
| 2020/0022094 | A1* | 1/2020 | You | H04W 52/365 |
| 2020/0067688 | A1* | 2/2020 | Li | H04L 5/001 |

OTHER PUBLICATIONS

ETRI, "Considerations on PRACH Design for NB-IoT," 3GPP TSG-RAN WG1 NB-IoT Ad-hoc Meeting, R1-160124, Jan. 2016, 5 pages.

CATT, "Discussion of NR Numerology," 3GPP TSG-RAN WG1 Meeting #85, R1-164249, May 2016, 7 pages.

InterDigital Communications, "NR Numerology," 3GPP TSG-RAN WG1 #85, R1-164666, May 2011, 7 pages.

* cited by examiner

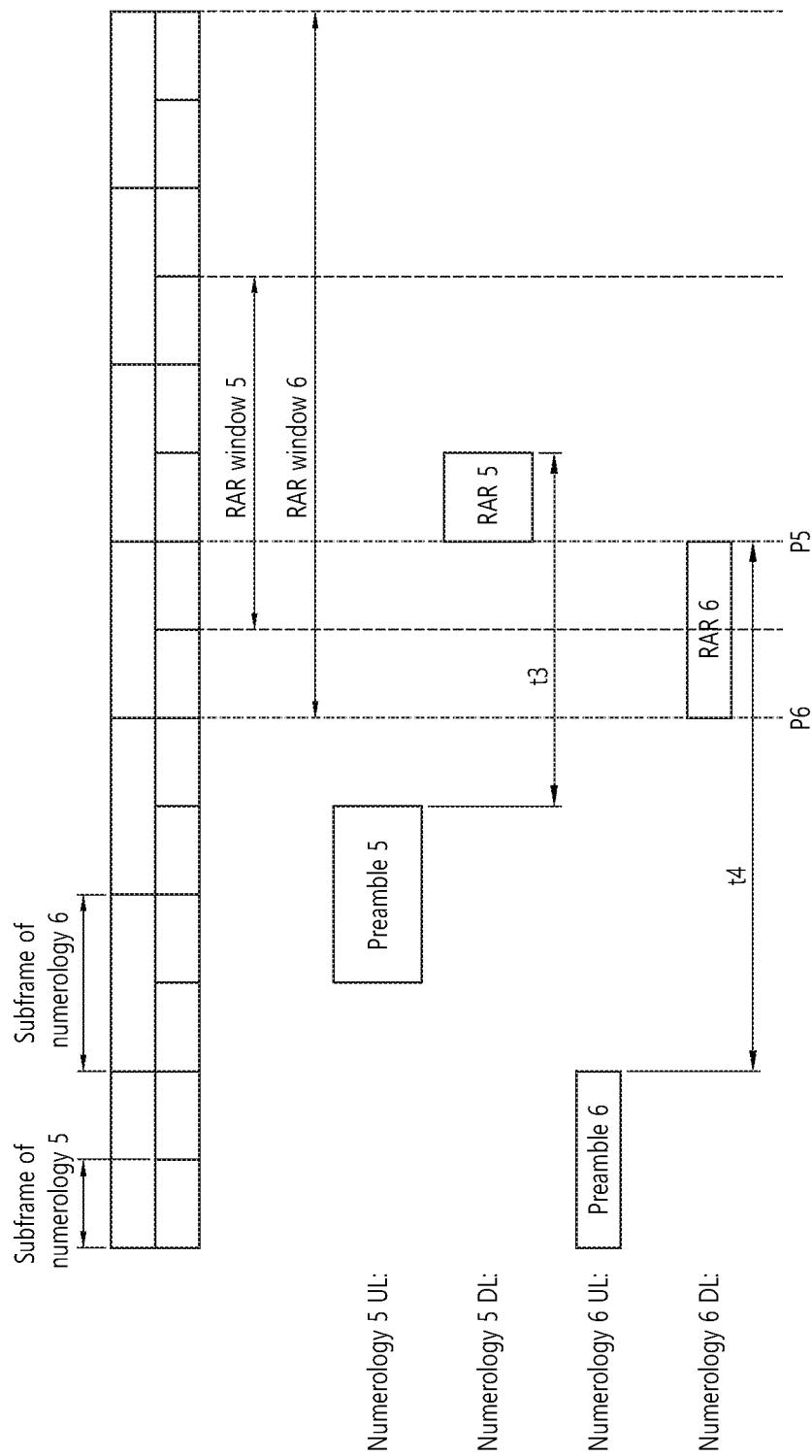

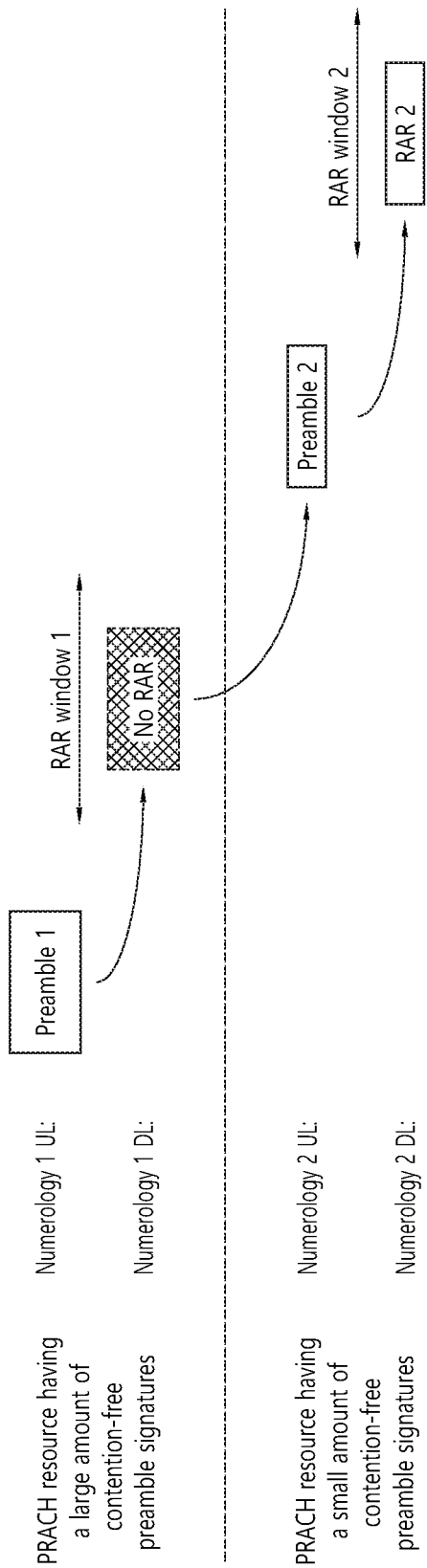

METHOD FOR PERFORMING RANDOM ACCESS AND TERMINAL FOR PERFORMING SAME

CROSS-REFERENCE TO RELATED APPLICATIONS

[0] This application is the National Stage filing under 35 U.S.C. 371 of International Application No. PCT/KR2017/006613, filed on Jun. 22, 2017, which claims the benefit of U.S. Provisional Application No. 62/353,533, filed on Jun. 22, 2016, and 62/429,083, filed on Dec. 2, 2016, the contents of which are all hereby incorporated by reference herein in their entirety.

BACKGROUND OF THE INVENTION

Field of the Invention

The present invention relates to wireless communication and, more specifically, to a method by which a UE performs random access using a PRACH resource through which a random access procedure suitable for the UE is performed among different PRACH resources provided by one or more cells.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas.

In general, a UE performs random access in order to access a network. Random access can be divided into contention-based random access and non-contention-based random access. The greatest difference between contention-based random access and non-contention-based random access is whether or not a random access preamble is dedicated to one UE. In non-contention-based random access, a contention (or collision) with other UEs is not generated because a UE uses a dedicated random access preamble designated thereto. Here, a contention means that two or more UEs attempt random access using the same random access preamble through the same resources. In contention-based random access, there is a possibility of a contention because a UE uses a randomly selected random access preamble.

Random access is performed in order to perform uplink synchronization or to request the allocation of uplink radio resources. For example, after being initially powered on, a UE can perform downlink synchronization and then perform random access in order to obtain uplink synchronization. For another example, in the state in which a Radio Resource Control (RRC) connection has not been established, a UE can perform random access in order to have uplink radio resources for uplink transmission allocated thereto. For yet another example, a UE may perform random access in order to initially access a target base station in a handover process.

Meanwhile, when one or more cells provide two or more different physical random access channels (PRACHs) in a random access procedure, a UE needs to select a PRACH most suitable therefor from the different PRACHs.

SUMMARY OF THE INVENTION

Accordingly, an object of a disclosure of the present description is to provide a method by which a UE performs random access using a PRACH resource through which a random access procedure most suitable for the UE is performed among different PRACH resources provided by one or more cells, and a UE performing the same.

To achieve the aforementioned purposes of the present invention, one disclosure of the present specification provides The present invention discloses a method of performing random access by a UE, the method comprises selecting, by the UE, a first resource among a plurality of resources for a physical random access channel (PRACH), wherein the plurality of resources being present per numerology, and wherein the numerology being defined by a cyclic prefix (CP) length and a subcarrier spacing; and transmitting, by the UE, the PRACH on the first resource through a first numerology when the selected first resource is for the first numerology.

Herein, the first resource is selected on the basis of information about at least one of coverage set for each of the plurality of resources and latency of the UE.

Herein, the first resource is selected based on the earliest PRACH transmission completion time or the earliest reception of a random access response to PRACH transmission.

Herein, the first resource is selected based on a resource having a large amount of contention-based preamble signatures among the plurality of resources.

The method further comprises selecting, by the UE, a second resource from the plurality of resources when the UE does not receive a random access response to the PRACH; and retransmitting the PRACH through a second numerology corresponding to the second resource.

The method further comprises receiving a physical downlink control channel (PDCCH) order from a base station, wherein the PDCCH order includes information about selection of the first resource.

The method further comprises receiving a random access response to the PRACH through the first numerology, wherein the PRACH including first configuration information about a resource suitable for the UE, and wherein the random access response including second configuration information about the resource as a response to the first configuration information; and transmitting uplink data through the second numerology on the basis of the second configuration information.

The method further comprises receiving, by the UE, downlink control information (DCI) for reception of the random access response, wherein the DCI includes first DCI and second DCI, and wherein the first DCI includes information about generation of the uplink data, and the second DCI triggers transmission of the generated uplink data.

The method further comprises receiving, by the UE, downlink control information (DCI) for reception of the random access response, wherein the DCI includes first DCI and second DCI, wherein the first DCI includes information about whether a PRACH resource can be changed, the second DCI includes configuration information necessary for PRACH resource change, and wherein the UE does not read the second DCI when the PRACH resource change is not approved.

To achieve the aforementioned purposes of the present invention, one disclosure of the present specification provides a UE performing random access, the UE comprises an RF unit configured to transmit a physical random access channel (PRACH); and a processor configured to control the RF unit, wherein the processor further configured to: select a first resource among a plurality of resources for the PRACH, wherein the plurality of resources being present per numerology, and wherein the numerology being defined by a cyclic prefix (CP) length and a subcarrier spacing, and transmit the PRACH on the first resource through a first numerology when the selected first resource is for the first numerology.

According to a disclosure of the present description, a UE can reduce latency when data is transmitted to a base station by using a PRACH resource through which random access is performed, which is most suitable for the UE.

BRIEF DESCRIPTION OF THE DRAWINGS

FIGS. 13a to 13c show examples of selecting one of a plurality of resources according to embodiments proposed in the present description.

FIGS. 14a and 14b show examples of changing resources according to embodiments proposed in the present description.

DESCRIPTION OF EXEMPLARY EMBODIMENTS

Figure 1:
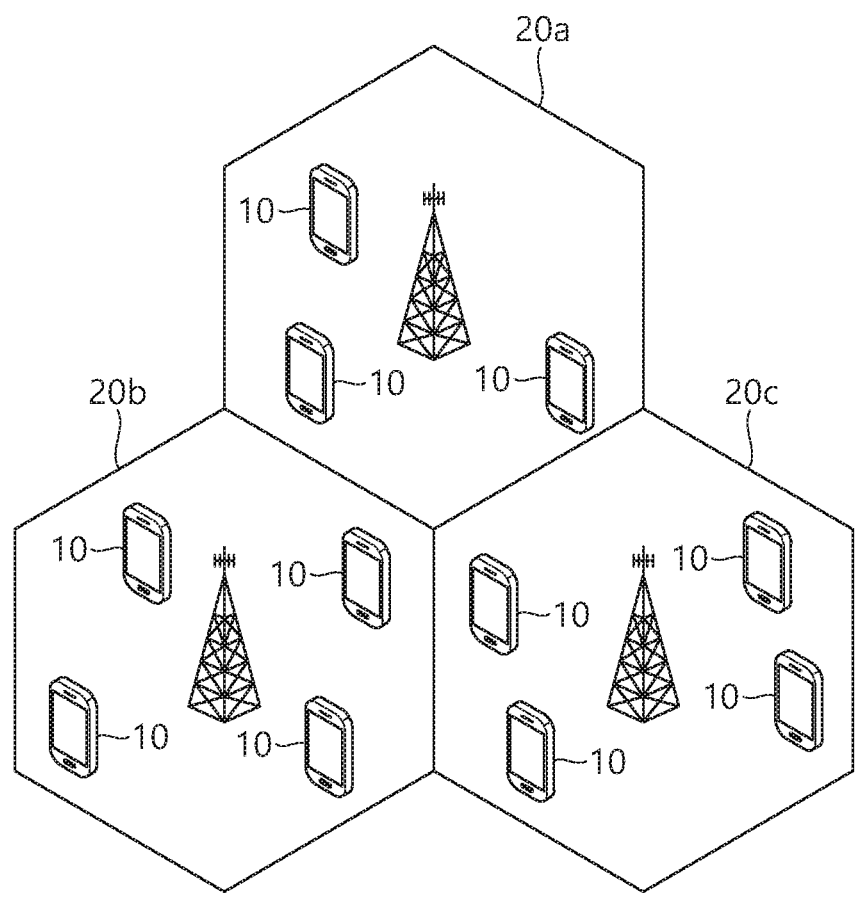
FIG. 1 illustrates a wireless communication system.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

A wireless device may be fixed or mobile, and may be referred to as another terminology, such as a UE, a mobile UE (MT), a user equipment (UE), a mobile equipment (ME), a mobile station (MS), a user UE (UT), a subscriber station (SS), a handheld device, an access UE (AT), etc.

A base station (BS) is generally a fixed station that communicates with the UE and may be referred to as another terminology, such as an evolved Node-B (eNB), a base transceiver system (BTS), an access point, etc.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with an IEEE 802.16e-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is evolved from the 3GPP LTE.

Although the case of LTE-A is mainly described herein for the clarity of description, the inventive concept is not limited thereto.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors). A UE (user equipment, UE) 10 may be fixed or movable and may be called other terms such as a mobile station (MS), a mobile UE (MT), a user UE (UT), a subscriber station (SS), a wireless device, a personal digital assistant (PDA), a wireless modem, a handheld device, and the like. The base station 20 generally represents a fixed station that communicates with the UE 10, and may be called different terms such as an evolved-NodeB (eNB), a base transceiver system (BTS), an access point, and the like.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna.

Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response.

In the TDD type, since an entire frequency band is time-divided in the uplink transmission and the downlink transmission, the downlink transmission by the base station and the uplink transmission by the UE may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
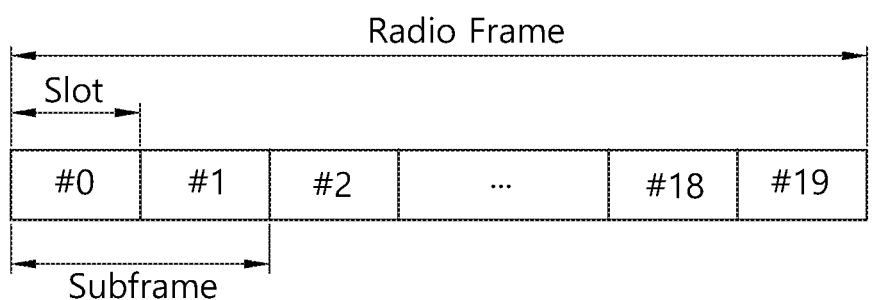
FIG. 2 illustrates the architecture of a radio frame according to frequency division duplex (FDD) of 3rd generation partnership project (3GPP) long term evolution (LTE).

FIG. 2 Shows a Downlink Radio Frame Structure in 3rd Generation Partnership Project (3GPP) Long Term Evolution (LTE).

The section 5 of 3GPP TS 36.211 V8.2.0 (2008-03) "Evolved Universal Terrestrial Radio Access (E-UTRA); Physical Channels and Modulation (Release 8)" may be incorporated herein.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Although it is described that one slot includes plural OFDM symbols for example, the number of OFDM symbols included in one slot may vary depending on a length of a cyclic prefix (CP).

Figure 3:
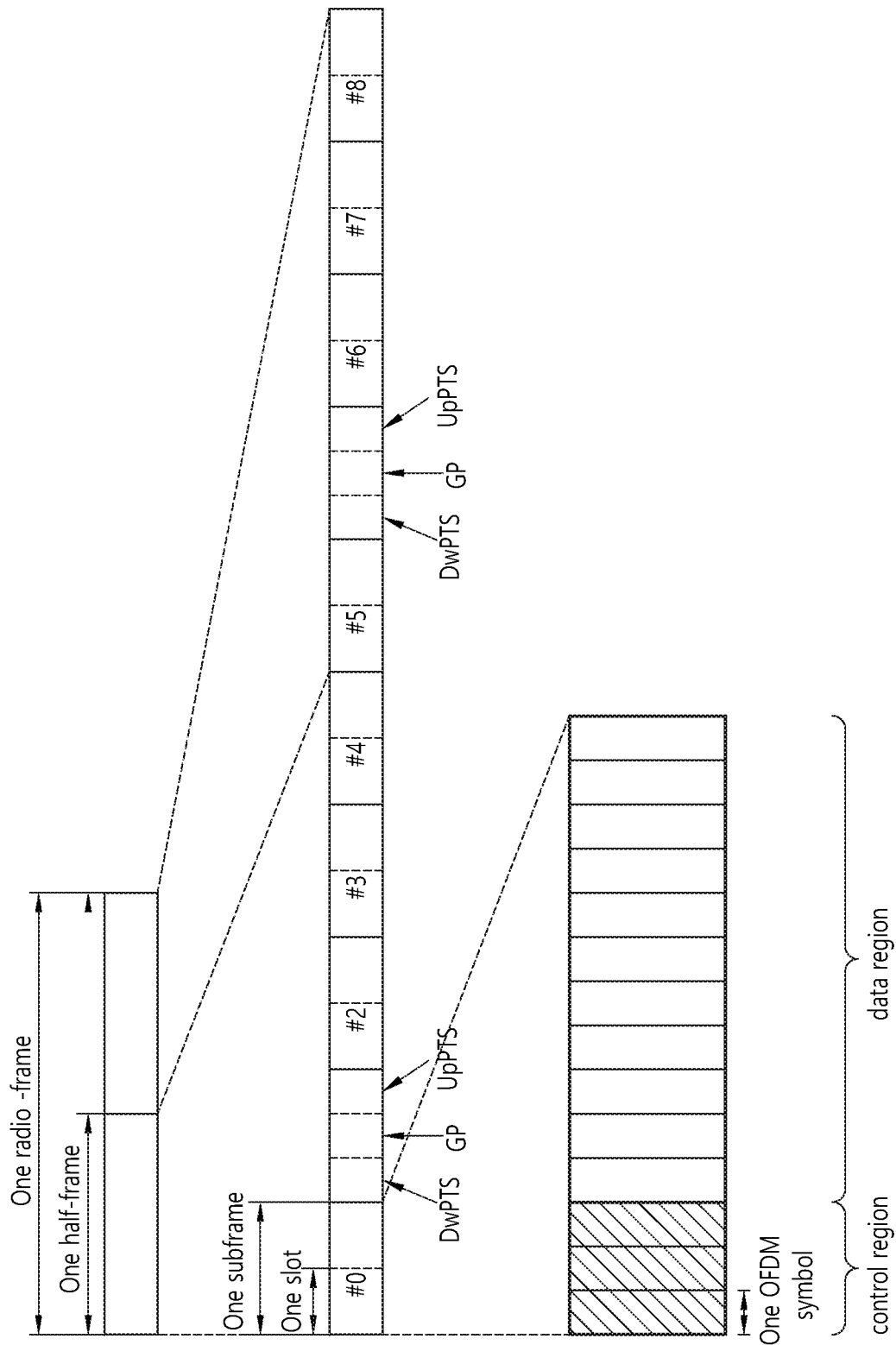
FIG. 3 illustrates the architecture of a downlink radio frame according to time division duplex (TDD) in 3GPP LTE.

FIG. 3 Shows a Downlink Radio Frame Structure According to TDD in 3GPP LTE.

The section 4 for TDD of 3GPP TS 36.211 V8.7.0 (2009-05) "Evolved Universal Terrestrial Radio Access (E-UTRA); Physical Channels and Modulation (Release 8)" may be incorporated herein.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A subframe having an index #1 and an index #6 is called a special subframe, and includes a downlink pilot time slot (DwPTS), a guard period (GP), and an uplink pilot time slot (UpPTS). The DwPTS is used in the UE for initial cell search, synchronization, or channel estimation. The UpPTS is used in the BS for channel estimation and uplink transmission synchronization of the UE. The GP is a period for removing interference which occurs in an uplink due to a multi-path delay of a downlink signal between the uplink and a downlink.

In TDD, a downlink (DL) subframe and an uplink (UL) subframe co-exist in one radio frame. Table 1 shows an example of a configuration of the radio frame.

TABLE 1

| UL-DL Config-uration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, "U" denotes a UL subframe, and 'S' denotes a special subframe. When the UL-DL configuration is received from the BS, the UE can know whether a specific subframe is the DL subframe or the UL subframe according to the configuration of the radio frame.

A DL subframe is divided into a control region and a data region in the time domain. The control region includes up to three preceding OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

Figure 4:
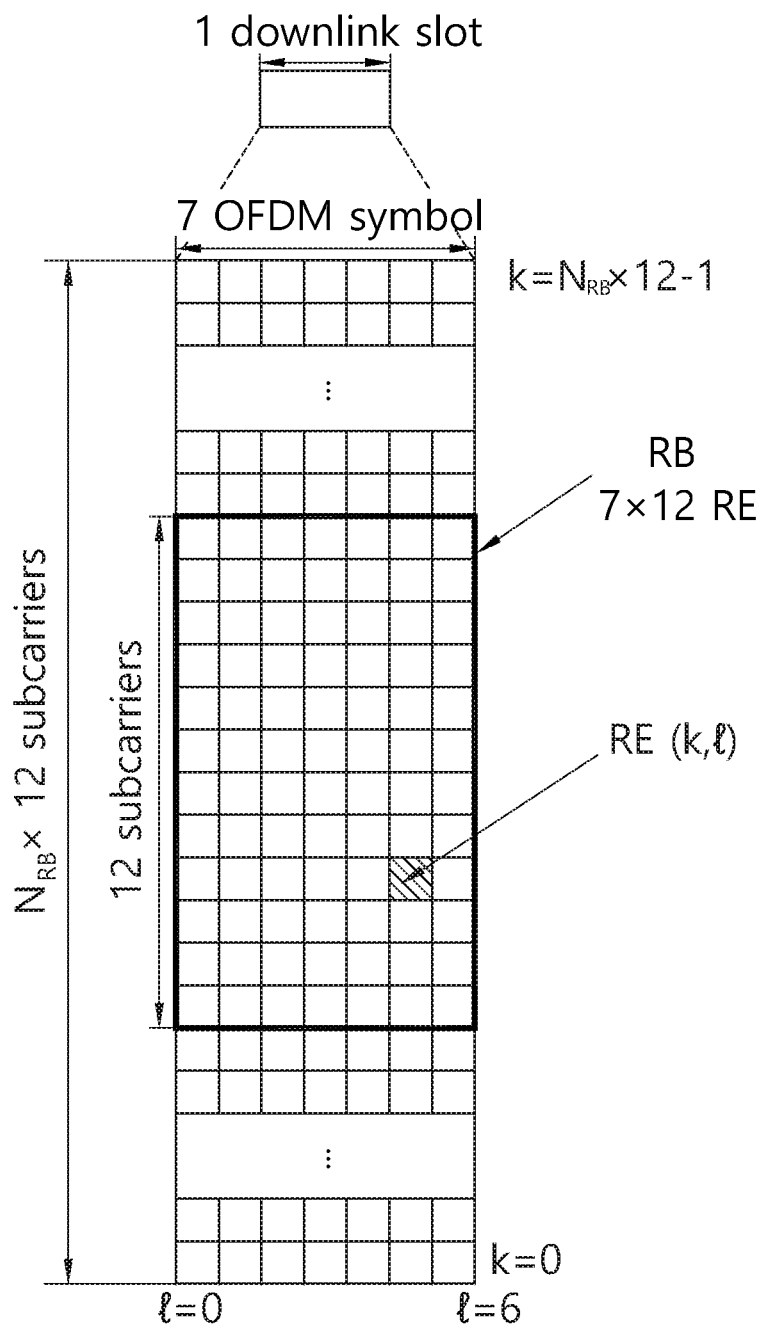
FIG. 4 illustrates an example resource grid for one uplink or downlink slot in 3GPP LTE.

FIG. 4 Illustrates an Example Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Here, by way of example, one resource block includes 7×12 resource elements that consist of seven OFDM symbols in the time domain and 12 subcarriers in the frequency domain. However, the number of subcarriers in the resource block and the number of OFDM symbols are not limited thereto. The number of OFDM symbols in the resource block or the number of subcarriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of subcarriers in the frequency domain. The number of resource blocks included in the uplink slot, i.e., NUL, is dependent upon an uplink transmission bandwidth set in a cell. Each element on the resource grid is denoted resource element.

Meanwhile, the number of subcarriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
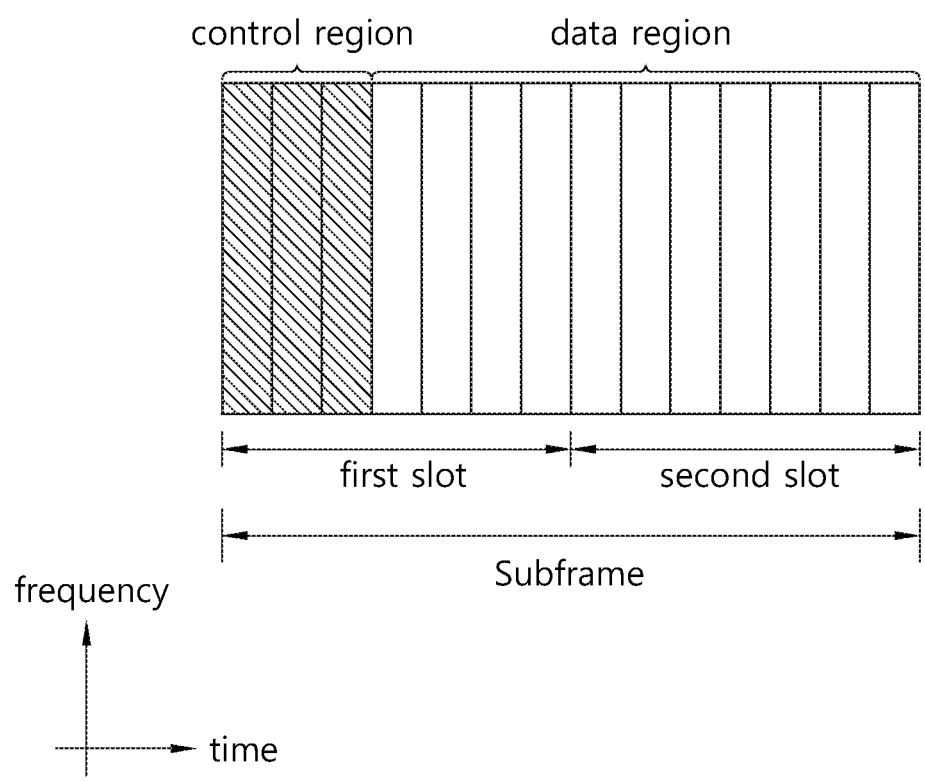
FIG. 5 illustrates the architecture of a downlink subframe.

FIG. 5 Illustrates the Architecture of a Downlink Subframe.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of subcarriers in one slot. For example, if one slot includes seven OFDM symbols in the time domain and the resource block includes 12 subcarriers in the frequency domain, one resource block may include 7×12 resource elements (REs).

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the subframe carries CIF (control format indicator) regarding the number (i.e., size of the control region) of OFDM symbols used for transmission of control channels in the subframe. The wireless device first receives the CIF on the PCFICH and then monitors the PDCCH.

Unlike the PDCCH, the PCFICH is transmitted through a fixed PCFICH resource in the subframe without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first subframe of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the UE may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the UE and adds a CRC (cyclic redundancy check) to control information. The CRC is masked with a unique identifier (RNTI; radio network temporary identifier) depending on the owner or purpose of the PDCCH. In case the PDCCH is for a specific UE, the UE's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the UE's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
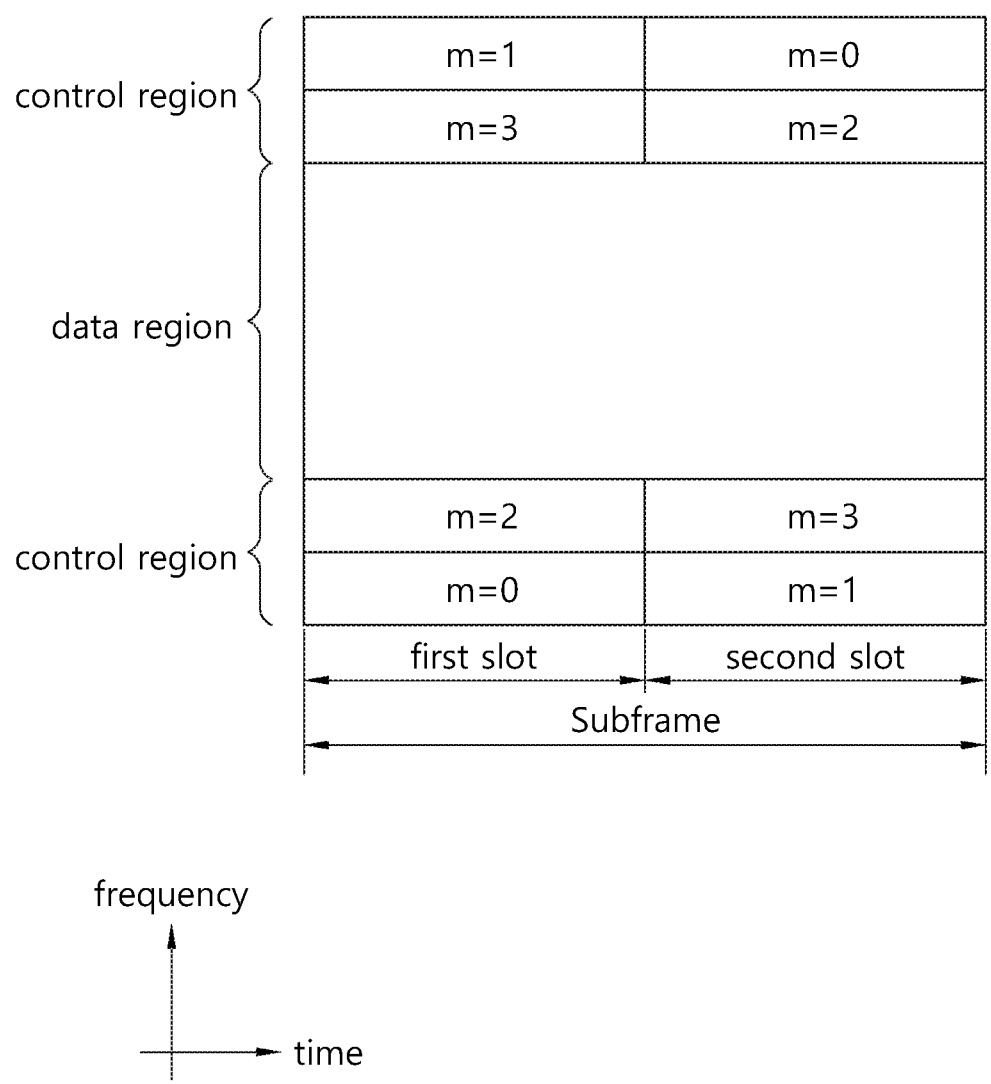
FIG. 6 illustrates the architecture of an uplink subframe in 3GPP LTE.

FIG. 6 Illustrates the Architecture of an Uplink Subframe in 3GPP LTE.

Referring to FIG. 6, the uplink subframe may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one UE is assigned in resource block (RB) pair in the subframe. The resource blocks in the resource block pair take up different subcarriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The UE may obtain a frequency diversity gain by transmitting uplink control information through different subcarriers over time. m is a location index that indicates a logical frequency domain location of a resource block pair assigned to the PUCCH in the subframe.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 7:
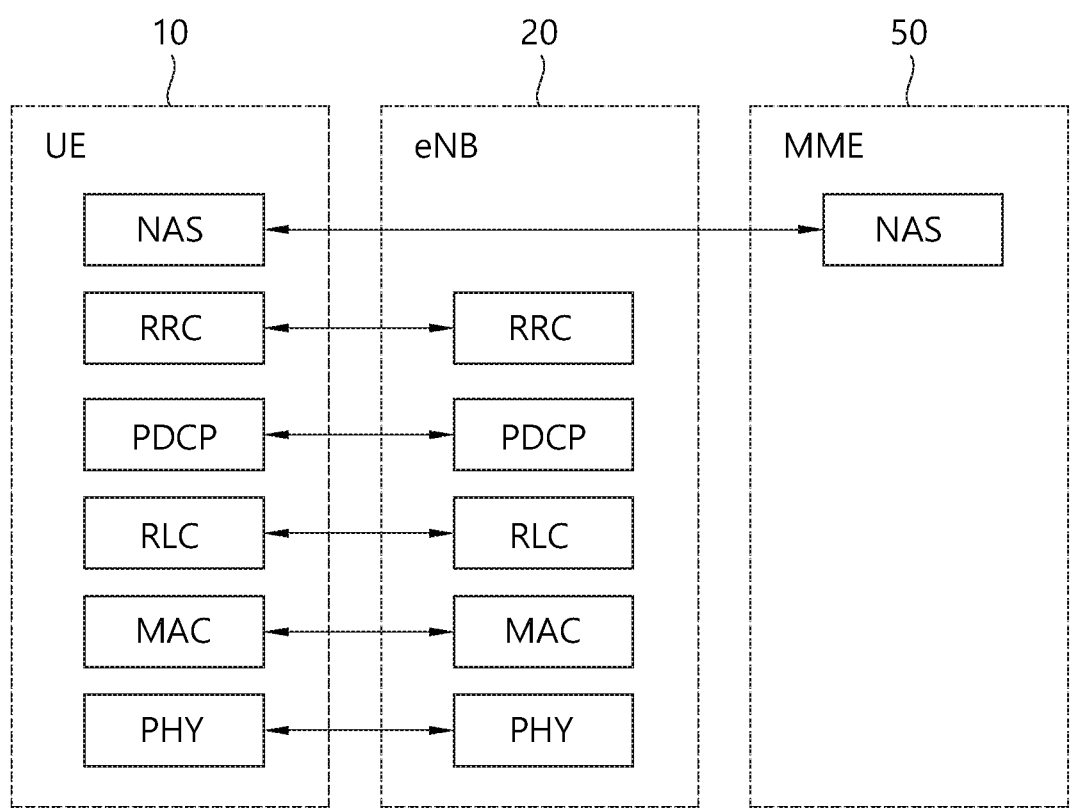
FIG. 7 is a block diagram illustrating the radio protocol architecture.

FIG. 7 is a Block Diagram Illustrating the Radio Protocol Architecture.

The data plane is a protocol stack for user data transfer and the control plane is a protocol stack for control signal transfer.

Referring to FIG. 7, the physical layer (PHY) provides upper-layer with information transfer service by using the physical channel. The physical layer is connected through transport channel unlike MAC (Medium Access Control) layer, the upper-layer. Data is transferred through transport channel between MAC layer and physical layer. The transport channels are classified according to how data is transferred with characteristics through radio interface.

Data is transferred between different physical layers, in other words, data is transferred through physical channel between the physical layers of the transmitter and receiver. The physical channel can be modulated by OFDM (Orthogonal Frequency Division Multiplexing) method, and time and frequencies are used as wireless resources.

The functions of MAC layer include mapping between the logical channel and transport channel, and multiplexing/inverse-multiplexing to the transport block provided via physical channel onto the transport channel of MAC SDU (service data unit) belonging to the logical channel MAC layer provides service to RLC (Radio Link Control) layer through logical channel.

Functions of RLC layer include concatenation, segmentation and reassembly of RLC SDUs. In order to ensure various QoS (Quality of Service) required by Radio Bearer (RB), the RLC layer provides three operation mode of transparent mode (TM), Unacknowledged Mode (UM) and Acknowledged Mode (AM). AM RLC provides error correction through ARQ (automatic repeat request).

Functions of PDCP (Packet Data Convergence Protocol) layer on user plane include transfer of user data, header compression and ciphering. Functions of PDCP (Packet Data Convergence Protocol) layer on user plane include transfer of control plane data and ciphering/integrity protection.

RRC (Radio Resource Control) layer is only defined on control plane. RRC layer performs the task of configuration of radio bearers, re-configuration and control of logical channel, transport channel and physical channel in relation to release. RB means a logical path which is provided by the 1st layer (PHY layer) and 2nd layer (MAC layer, RLC layer and PDCP layer) to transfer data between the UE and network.

The process of configuring RB means that characteristics of radio protocol layer and channel are specified for providing specific service and specific parameters and operation methods are configured for each service. RB is then divided into two types of SRB (Signaling RB) and DRB (Data RB). SRB is used as a passage for transferring RRC message on the control plane, and DRB is used as a passage for transferring user data on the user plane.

When RRC connection (RRC Connection) is established between the RRC layer of the UE and RRC layer of E-UTRAN, the UE can be in RRC connected state, or otherwise in RRC idle state.

As for downlink transport channels, which transfer data from network to the UE, there is BCH (Broadcast Channel) which transfers system information, and downlink SCH (Shared Channel) which transfers other information such as user traffic or control message. In the case of traffic or control message of downlink multicast or broadcast service, transfer can be performed through downlink SCH or through separate downlink MCH (Multicast Channel). Meanwhile, as for uplink transport channels, which transfer data from the UE to network, there are RACH (Random Access Channel) which transfers initial control message, and uplink SCH (Shared Channel) which transfers other information such as user traffic or control message.

As for logical channels, which is above the transport channel and are mapped to the transport channel, there are BCCH (Broadcast Control Channel), PCCH (Paging Control Channel), CCCH (Common Control Channel), MCCH (Multicast Control Channel), MTCH0 (Multicast Traffic Channel), etc.

The physical channel consists of multiple OFDM symbols in time domain and multiple subcarrier in frequency domain. A subframe consists of multiple OFDM Symbols in time domain. The resource block is a unit of resource allocation and consists of multiple OFDM symbols and multiple subcarriers. Also, each subframe can use specific subcarriers of specific OFDM symbols (e.g., the 1st OFDM symbol) of corresponding subframe for PDCCH (Physical Downlink Control Channel) i.e. for L1/L2 control channel TTI (Transmission Time Interval) is a unit time for subframe transfer.

The RRC state of the UE and the method of RRC connection will be described below.

RRC state means whether the RRC layer of the UE is logically connected with the RRC layer of E-UTRAN or not, and is called to be in RRC connection state when connection is established, or in RRC IDLE STATE when connection is not established. The UE in RRC connection state can be identified by E-UTRAN since there exists RRC connection, and therefore effective control of the UE is possible. On the other hand, the UE in RRC IDLE STATE cannot be identified by E-UTRAN, and is controlled by CN (core network) in the unit of Tracking Area which is larger unit of area than the cell. In other words, the UE in RRC IDLE STATE is only identified in the unit of large area and so should transit to RRC connection state to receive conventional mobile communication service such as voice and data.

When a user first turns the UE on, the UE first searches appropriate cell and stays in corresponding cell in RRC IDLE STATE. The UE in RRC IDLE STATE establishes RRC connection with E-UTRAN through RRC connection procedure when there needs RRC connection, and transit to RRC connection state. The UE in RRC IDLE STATE needs RRC connection for various reasons such as the need for uplink data transfer to try to call by the user or, when paging message is received from E-UTRAN, transfer of response message.

NAS (Non-Access Stratum) layer, which is above RRC layer, performs the function such as session management and mobility management.

Two states, EMM-REGISTERED (EPS Mobility Management-REGISTERED) and EMM-DEREGISTERED are defined to manage the mobility of UE in NAS layer, and two states are applied to the UE and MME. Initially, the UE is in EMM-DEREGISTERED state, and the UE performs the process of registering to corresponding network through the process of Initial Attach to access to the network. If the Attach process is successfully performed, the UE and MME are in EMM-REGISTERED state.

In order to manage signaling connection between the UE and EPC, two states are defined, ECM (EPS Connection Management)-IDLE state and ECM-CONNECTED, which are applied to the UE and MME. When a UE on ECM-IDLE state establishes RRC connection with E-UTRAN, corresponding UE is in the state of ECM-CONNECTED. When MME in ECM-IDLE state establishes 51 connection with E-UTRAN, it is in the state of ECM-CONNECTED. When the UE is not in ECM-IDLE state, E-UTRAN does not have context information of the UE. Therefore, the UE in ECM- IDLE state performs the process related to mobility, e.g. cell selection or cell reselection, on its own base without requiring command from the network. When the UE is in ECM-CONNECTED state, however, the mobility of the UE is controlled by the command from the network. When the location of the UE in ECM-IDLE state is changed from what is known to the network, the UE notifies the network of its location through Tracking Area Update procedure.

Now, system information will be described.

System information includes basic information the UE should know for accessing the base station. Therefore, the UE should receive all the system information to access the base station, and have most recent system information. Since the system information is information that every UE in corresponding cell should know, the base station periodically transmits the system information.

According to section 5.2.2 of 3GPP TS 36.331 V8.7.0 (2009-09) "Radio Resource Control (RRC); Protocol specification (Release 8)", the system information is divided into MIB (Master Information Block), SB (Scheduling Block) and SIB (System Information Block). MIB enables the UE to recognize physical construction of corresponding cell such as bandwidth. SB informs transfer information of SIB such as transfer period. SIB is a set of relevant system information. For example, some SIBs only include information of neighboring cells, and other SIBs only include the information of uplink radio channel the UE uses.

A BS transmits a paging message in order to inform UE whether or not system information has been changed. In this case, the paging message can include a system information change indicator. UE receives a paging message according to paging discontinuous reception (DRX). If the paging message includes a system information change indicator, the UE receives system information that is transmitted through a BCCH, that is, a logical channel.

Random access is described below. Random access is used for UE to obtain uplink synchronization with a BS or to have uplink radio resources allocated thereto. After being powered on, UE initially obtains downlink synchronization with a cell and receives system information. Furthermore, the UE obtains a set of available random access preambles and information about radio resources used to transmit random access preambles from the system information. The radio resources used to transmit random access preambles can be specified as a radio frame and/or a set of one or more subframes. The UE transmits random access preambles randomly selected from the set of random access preambles. The BS that has received the random access preambles sends a Timing Alignment (TA) value for uplink synchronization to the UE through a random access response. Accordingly, the UE obtains uplink synchronization.

That is, the BS allocates a dedicated random access preamble to a specific UE, and the UE performs non-contention random access by using the corresponding random access preamble. That is, in the process of selecting the random access preamble, there may exist the contention based random access in which the UE uses by arbitrary selecting one among a specific set and the non-contention random access that uses the random access preamble allocated to the specific UE by the BS. The non-contention random access may be used for the process of handover or in case of being requested by an order of BS.

Figure 8:
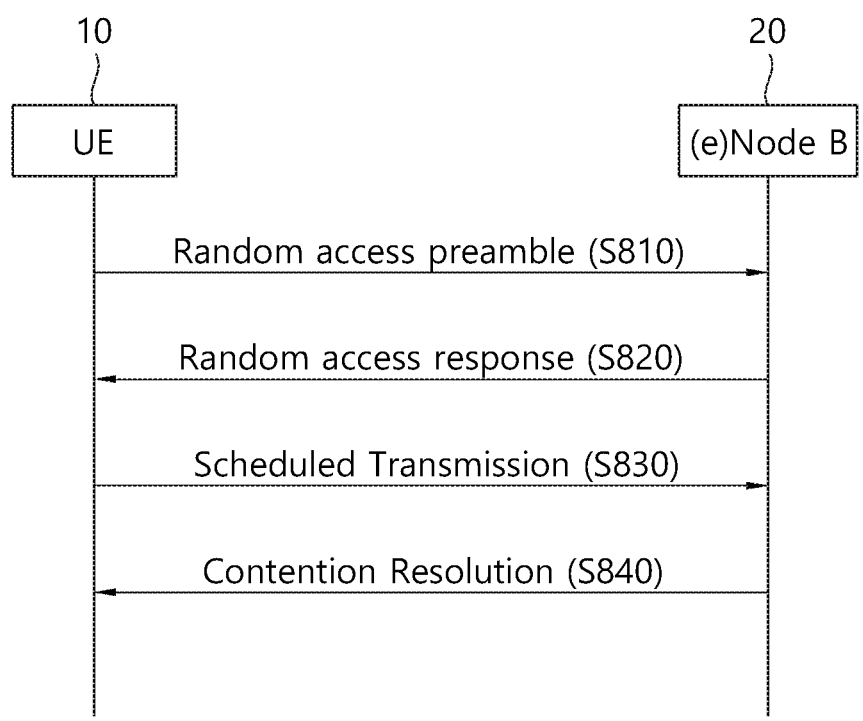
FIG. 8 is a diagram showing a contention-based random access method.

FIG. 8 is a Diagram Showing a Contention-Based Random Access Method.

Referring to FIG. 8, UE randomly selects one random access preamble from a set of random access preambles indicated by system information or a handover command.

Furthermore, the UE selects radio resources through which the random access preamble can be transmitted and transmits the selected random access preamble (S810). The radio resources can be a specific subframe, which may be for selecting a physical random access channel (PRACH).

After transmitting the random access preamble, the UE attempts to receive a random access response within a random access response reception window indicated by the system information or the handover command and thus receives a random access response (S820). The random access response is transmitted in an MAC PDU format, and the MAC PDU can be transmitted through a Physical Downlink Shared Channel (PDSCH). Furthermore, a Physical Downlink Control Channel (PDCCH) is also transferred to the UE so that the UE may properly receive information transferred through the PDSCH. That is, the PDCCH includes information about the UE that receives the PDSCH, information about the frequency and time of radio resources of the PDSCH, and the transport format of the PDSCH, etc. If the UE successfully receives the PDCCH transferred thereto, the UE properly receives the random access response that is transmitted through the PDSCH based on the PDCCH information.

The random access response can include a random access preamble ID, an UL grant (uplink radio resources), a temporary Cell-Radio Network Temporary Identifier (C-RNTI), and a Time Alignment Command (TAC). Since one random access response can include random access response information for one or more pieces of UE, a random access preamble ID can be included in order to inform that an UL grant, a temporary C-RNTI, and a TAC included in the random access response are valid for what UE. The random access preamble ID can be an ID of a random access preamble received by an eNodeB. The TAC can be included as information on which the UE coordinates uplink synchronization. The random access response can be indicated by a random access ID on a PDCCH, that is, a Random Access-Radio Network Temporary Identifier (RA-RNTI).

When the UE receives a random access response valid for the UE, the UE processes information included in the random access response and performs transmission scheduled for the eNodeB (S830). That is, the UE applies the TAC and stores a temporary C-RNTI. Furthermore, the UE transmits data stored in the buffer of the UE or newly generated data to the eNodeB using an UL grant. In this case, the data needs to include information on which the UE can be identified. This is because the eNodeB is unaware that what pieces of UE perform random access in a contention-based random access process. Thus, it is necessary to identify the UE for a subsequent contention resolution.

A method of including information capable of identifying UE includes two types of methods. If the UE has already had a valid cell ID allocated thereto in a corresponding cell before performing random access, the UE transmits its own cell ID through an UL grant. In contrast, if a valid cell ID has not been allocated to the UE prior to a random access process, the UE transmits data including its own unique ID (e.g., an S-TMSI or a random ID). In general, the unique ID is longer than a cell ID. If the UE has transmitted the data through the UL grant, the UE starts a timer for a contention resolution (contention resolution timer).

After the UE receives the random access response and transmits the data including its own ID through the allocated UL grant, the UE waits for an instruction from the eNodeB for a contention resolution (S840). That is, the UE attempts to receive a PDCCH in order to receive a specific message. Two types of methods can be proposed as a method of receiving a PDCCH. If its own ID transmitted through the UL grant as described above is a cell ID, the UE can attempt to receive a PDCCH using its own cell ID. In this case, if the UE receives a PDCCH through its own cell ID before the contention resolution timer expires, the UE determines that the random access has been normally performed and terminates the random access. If the ID transmitted through the UL grant is a unique ID, the UE attempts to receive a PDCCH using a temporary C-RNTI included in the random access response. In this case, if the UE has received a PDCCH through a temporary cell ID before the contention resolution timer expires, the UE checks data transferred through a PDSCH indicated by the PDCCH. If its own unique ID is included in the data, the UE can determine that the random access has been normally performed and terminate the random access.

Figure 9:
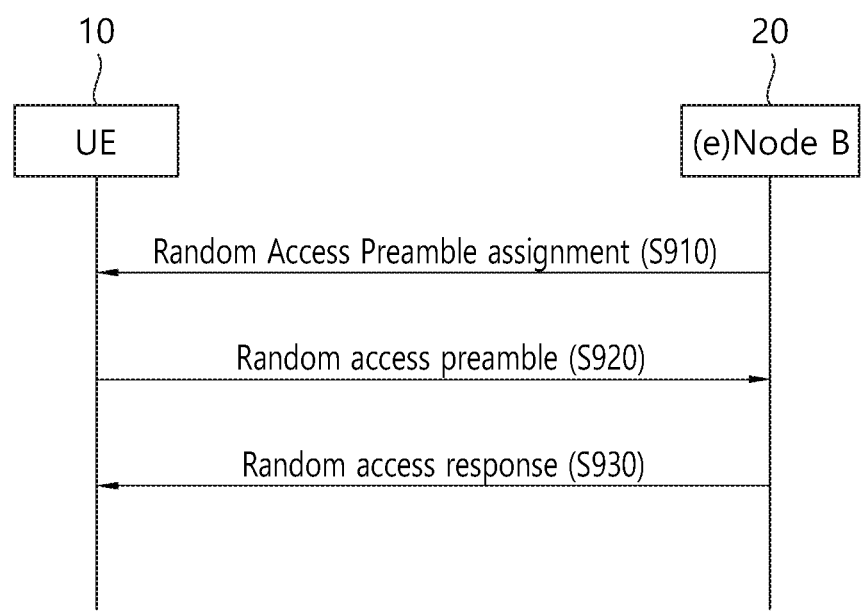
FIG. 9 is a diagram showing a non-contention-based random access method.

FIG. 9 is a Diagram Showing a Non-Contention-Based Random Access Method.

Unlike the contention-based random access, non-contention-based random access can be terminated when UE receives a random access response.

Non-contention-based random access can be initiated in response to handover and/or a request, such as a command from an eNodeB. In the two cases, contention-based random access can be performed.

UE receives a designated random access preamble without a contention possibility from an eNodeB. The allocation of the random access preamble may be performed in response to a handover command and a PDCCH command (S910).

After the random access preamble designated to the UE is allocated to the UE, the UE transmits the corresponding random access preamble to the eNodeB (S920).

When the random access preamble is received, the eNodeB transmits a random access response to the UE as a response (S930). For a procedure related to the random access response, reference can be made to S820 of FIG. 8.

A method for a contention resolution in random access is described below.

The reason why a contention is generated in performing random access is that the number of random access preambles is basically limited. That is, since an eNodeB cannot assign UE-unique random access preambles to all pieces of UE, UE randomly selects one of common random access preambles and transmits the selected random access preamble. Accordingly, two or more pieces of UE may select the same random access preamble and transmit the selected random access preamble through the same radio resources (PRACH resources), but an eNodeB determines the received random access preamble to be one random access preamble received from one piece of UE. For this reason, the eNodeB transmits a random access response to UE and expects that the random access response will be received by one piece of UE. However, since a contention can occur as described above, the two or more pieces of UE receive the one random access response, and thus each of the pieces of UE performs an operation according to the reception of the random access response. That is, there is a problem in that the two or more pieces of UE transmit different data through the same radio resources using one UL grant included in the random access response. As a result, the transmission of the data may all fail, and the eNodeB may receive only the data of specific UE depending on the locations or transmission power of the pieces of UE. In the latter case, since all the two or more pieces of UE assume that the transmission of their own data has been successful, the eNodeB needs to inform pieces of UE that have failed in the contention of information about the failure. That is, to inform information about the failure or success of a contention is called a contention resolution.

A contention resolution method includes two types of methods. One method includes a method using a contention resolution timer (hereinafter called a CR timer), and the other method is a method of transmitting an ID of successful UE to pieces of UE. The earlier case is used when UE already has a unique cell ID (C-RNTI) prior to a random access process. That is, UE already having a cell ID transmits data, including its own cell ID, to an eNodeB in response to a random access response, and actuates a CR timer. If PDCCH information including its own cell ID is received before the CR timer expires, the UE determines that it has been successful in a contention and normally terminates random access. If the UE has not received a PDCCH including its own cell ID before the CR timer expires, however, the UE determines that it has failed in a contention and may perform a random access process again or inform a higher layer of the failure fact. From among the contention resolution methods, the latter case, that is, a method of transmitting an ID of UE, is used when UE does not have a unique cell ID prior to a random access process. That is, if UE does not have its own cell ID, the UE transmits data, including an ID (S-TMSI or random ID) higher than a cell ID, based on UL grant information included in a random access response and actuates a CR timer. If the UE receives data including its own higher ID through a DL-SCH before the CR timer expires, the UE determines that a random access process has been successful. In contrast, if the UE has not received data including its own higher ID through a DL-SCH before the CR timer expires, the UE determines that a random access process has failed.

Figure 10:
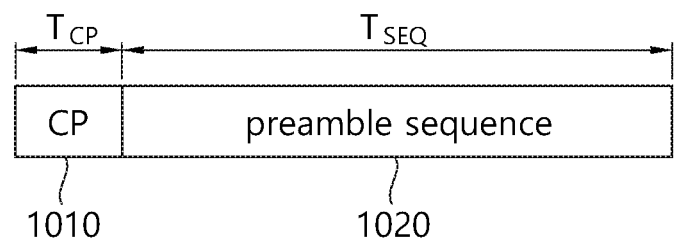
FIG. 10 is a diagram showing the structure of a random access preamble.

FIG. 10 is a Diagram Showing the Structure of a Random Access Preamble.

Referring to FIG. 10, the random access preamble includes a cyclic prefix (CP) 510 and a preamble sequence 1020. The length of the cyclic prefix can be represented as TCP, and the length of the preamble sequence can be represented as TSEQ.

The random access preamble may have a different format depending on a frame structure and a random access configuration. For this, reference can be made to Table 1 below. In Table 1, Ts indicates a basic time unit.

TABLE 2

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |

In case that transmission of the random access preamble is triggered by MAC layer, the transmission of random access preamble is limited to a specific time and frequency resource. Such a resource is listed in ascending order in physical resource block in subframe number and frequency domain of a radio frame.

For preamble format 0 to 3, for example, in the frame structure according to FDD depicted in FIG. 2, a random access resource per a subframe may be existed. Table 3 below represents the subframe in which the random access preamble permitted for given configuration in the frame structure according to FDD is permitted.

The random access preamble may be defined by a Zadoff-Chu (ZC) sequence as follows.

$$x(n) = e^{-\frac{\pi k n(n+1)}{N}}$$ [Equation 1]

Herein, k denotes a root index, and N denotes a length of the sequence, where 0<=n<=(N-1).

TABLE 3

| PRACH configuration index | Preamble format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

Referring to Table 3 above, the available UL radio resource for random access may be specified according to a preamble format, a system frame number and a subframe number, and the specified UL radio resource may be indexed by the PRACH configuration index.

The preamble format is configured as a value that indicates five sort of random access preamble formats described above with reference to Table 2. The preamble format may have a value of 0 to 4. The preamble format may be determined according to cell environment, network state, etc. Preamble format 0 may be used for normal environment. Preamble format 1 may be used for the case in which time retard is significant such as the cell environment of big radius. Preamble format 2 is for the case of sending sequence repeatedly in considering the situation in which signal to interference noise ratio (SINR) is low, and may be used for the case in which cell radius is within 30 km. Preamble format 3 is for the case of sending sequence repeatedly in considering the situation in which SINR is low, and may be used for the case in which cell radius is within 100 km.

The system frame number may be configured as a value for specifying a radio frame that may be used as the PRACH which is a radio resource for random access among the above described radio frames. The system frame number may be configured to indicate that any radio frames may be used for random access and/or a radio frame having a specific index such as even numbers may be used for random access.

The subframe number may be configured to indicate an index number of the subframe which may be used for random access within a radio frame. The number of subframe that can be used as the PRACH for random access within a radio frame may be one or more.

An available subframe for transmitting random access preamble may be allocated to a UE through the UL radio resource information which is included in the system information and the UE may verify it. For example, when the UE receives an available UL radio resource information which is configured to indicate '8' as a PRACH configuration index, the UE may identify that the random access preamble may be transmitted through number '3' and '8' of all radio frames. In this case, number '0' format may be used as the preamble format.

As described so far, in the conventional 3GPP LTE, the PRACH operation is performed for the purposed of initial access, handover, or UL synchronization of a UE, that is, a UE.

Figure 11:
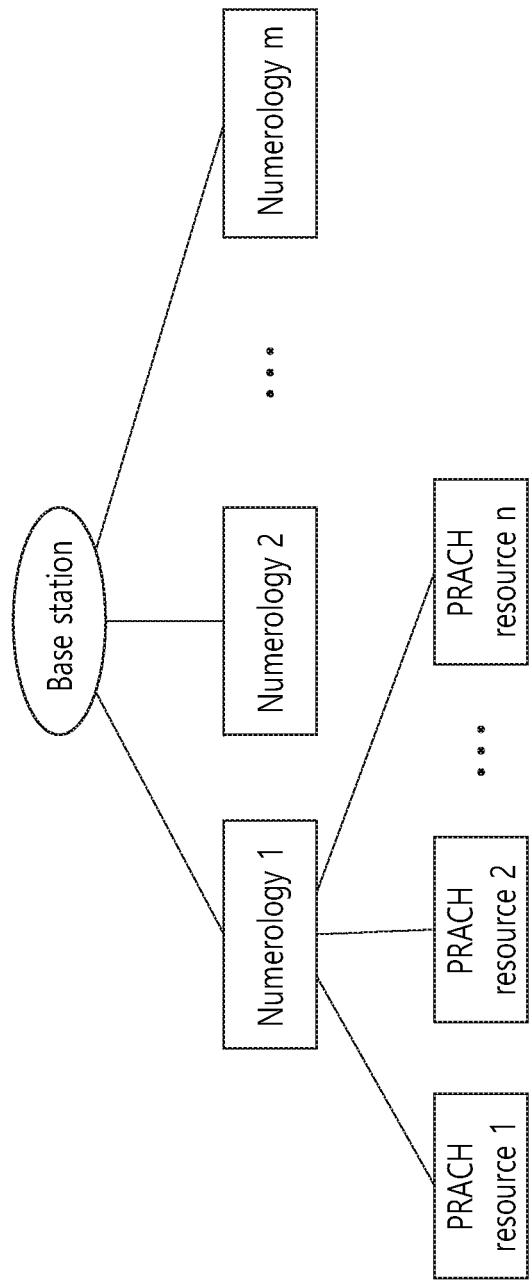
FIG. 11 shows a system that provides a plurality of numerologies according to an embodiment proposed in the present description.

FIG. 11 Shows a System that Provides a Plurality of Numerologies According to an Embodiment Proposed in the Present Description.

With the development of wireless communication technology, a plurality of numerologies may be provided to UEs in future systems.

Numerology can be defined by a CP (cyclic prefix) length and a subcarrier spacing. One cell can provide a plurality of numerologies to UEs.

Although it is assumed that one numerology provides one PRACH resource in the present description, the present invention is not limited thereto. That is, one numerology may provide a plurality of different PRACH resources. The plurality of different PRACH resources may be configured to have different timings. A UE can select a resource set suitable for the situation thereof from a plurality of PRACH resources and transmit a PRACH. RACH configuration information transmitted from an eNodeB may include parameters related to random access response transmission timing and procedure as well as information about numerologies.

When a time at which the UE receives a random access response, the eNodeB can set a timing at which the UE receives the random access response after transmission of the PRACH. According to an embodiment, the timing may be set to a function with respect to k. For example, when k=0, the random access response and the can be transmitted in the same slot as that for the PRACH or transmitted along with the PRACH in a basic size (m slot size, m being a natural number) of a RACH resource.

The UE can transmit msg3 irrespective of random access response reception timing. For example, the value k can be set differently for PRACH resources or random access response resources, and the UE can select a resource suitable therefor according to the value k.

A system that supports a plurality of different numerologies can use at least one PRACH resource. For example, when the system uses two different numerologies, the system can select one of the numerologies and allocate a PRACH resource thereto and may allocate different PRACH resources to the respective numerologies. When PRACH resources are allocated to the respective numerologies, the allocated PRACH resources can be distinguished using time or frequency.

The PRACH resources allocated to the respective numerologies may have different PRACH formats. Each numerology can have a CP length and a sequence duration and suitable for characteristics thereof. Numerologies can support different PRACH formats that meet system requirements. Numerologies can be classified on the basis of coverage, latency and application and may allocate the amount of PRACH resources depending on contention-free method or contention-based method.

To select a PRACH resource allocated to each numerology, the UE can send a request for configuration information about a numerology and/or a PRACH resource suitable therefor to the eNodeB. The configuration information may be included in a random access preamble. The eNodeB can transmit a random access response including the configuration information about a numerology and/or a PRACH resource, which is requested by the UE, to the UE as a response to the configuration information.

According to embodiments, requesting, by the UE, configuration information about a numerology and/or a PRACH resource suitable therefor may be performed through 1 step. The 1 step may refer to a step in which the UE requests the configuration information about a numerology and/or a PRACH resource through transmission of a random access preamble and the eNodeB transmits one random access preamble including the configuration information about a numerology and/or a PRACH resource to the UE as a response to the request. The configuration information can include information about standards or selecting a numerology and a PRACH resource. Some or all of the standards for selecting a numerology and a PRACH resource may be overlap or may be independent.

According to other embodiments, requesting, by the UE, configuration information about a numerology and/or a PRACH resource suitable therefor may be performed through 2 steps. Configuration information for selecting a numerology by the UE may be distinguished from configuration information for selecting a PRACH resource. For example, the UE can request the configuration information for selecting a numerology first and then request the configuration information for selecting a PRACH resource after selecting a numerology. According to embodiments, the UE can receive configuration information about the selected numerology from the eNodeB between the request for the configuration information for selecting a numerology and the request for the configuration information for selecting a PRACH resource. Although standards for selecting a numerology and a PRACH resource may be independent, some or all thereof may be overlap.

The present invention proposes a method by which a UE can select a PRACH resource suitable for the situation and purpose thereof when different PRACH resources are allocated to numerologies in a system that can use a plurality of numerologies. Although a PRACH resource selection method in a future system using different numerologies is described in the present description, the present invention is not limited thereto. That is, the PRACH resource selection method of the present invention can be applied to various communication systems using a plurality of PRACH resources.

Figure 12:
FIG. 12 shows examples in which PRACH resources can be configured according to embodiments proposed in the present description.

FIG. 12 Shows Examples in which PRACH Resources can be Configured According to Embodiments Proposed in the Present Description.

FIG. 12(a) shows a case in which a RACH burst period and RACH burst timing of a first numerology Numerology1 are the same as a RACH burst period and RACH burst timing of a second numerology Numerology2. In the case of FIG. 12(a), a UE can select and use a RACH resource suitable for the situation thereof because the first numerology Numerology1 and the second numerology Numerology2 have the same the RACH burst timings and RACH burst periods according to PRACH resource configuration.

According to the embodiment illustrated in FIG. 12(a), PRACH resource information broadcast in each numerology can be solely transmitted to the UE because information about PRACH resource configuration is identical in all numerologies. Here, the UE can acquire PRACH configuration information of other numerologies using PRACH resource information transmitted from one numerology. For example, when the UE receives PRACH resource configuration information through a PBCH of the first numerology that uses a subcarrier spacing having a first size, the UE can determine that PRACH resource configuration information of the second numerology is the same as the PRACH resource configuration information of the first numerology even though the UE does not receive the PRACH resource configuration information of the second numerology that uses a subcarrier spacing having a second size.

FIG. 12(b) shows a case in which the first numerology Numerology1 and the second numerology Numerology2 have the same RACH burst period and different RACH burst timings. In the case of FIG. 12(b), although the RACH burst periods of the numerologies are the same as those of the numerologies shown in FIG. 12(a), a RACH burst period in the entire system can be reduced.

When a UE selects one of the first numerology and the second numerology, the UE can select a numerology that transmits a PRACH resource suitable therefor. Here, latency for selecting a PRACH resource can be reduced in the case of FIG. 12(b) compared to the case illustrated in FIG. 12(a).

In the case illustrated in FIG. 12(b), the RACH burst timing of the first numerology and the RACH burst timing of the second numerology need to be defined differently from each other. Accordingly, to detect even PRACH resource configuration information of the other numerology (e.g., the second numerology) through broadcast information of one numerology (e.g., the first numerology), the UE needs to acquire all information about RACH burst timings used in the numerologies. Accordingly, the UE can receive common information (e.g., RACH burst period) and different pieces of information (e.g., RACH burst timings) from the numerologies. The UE can acquire PRACH resource configuration information of the other numerology (e.g., the second numerology) in addition to PRACH resource configuration information of the numerology (e.g., the first numerology) corresponding to the same broadcast information as a received PBCH by receiving the common information and the different pieces of information.

FIG. 12(c) shows a case in which the first numerology Numerology1 and the second numerology Numerology2 have the same RACH burst timing and different RACH burst periods. Here, the RACH burst period of one numerology may be an integer multiple of the RACH burst period of the other numerology. When the numerologies have different RACH burst periods, a UE can select a numerology to be used for a RACH on the basis of latency characteristics. For example, when the RACH burst period of the second numerology Numerology2 is shorter than the RACH burst period of the first numerology Numerology1 and thus the UE requires low latency, the UE can select a RACH procedure using the second numerology Numerology2.

In the case illustrated in FIG. 12(c), the RACH burst period of the first numerology needs to be defined differently from the RACH burst period of the second numerology. Accordingly, to detect even PRACH resource configuration information of the other numerology (e.g., the second numerology) through broadcast information of one numerology (e.g., the first numerology), the UE needs to acquire all information about RACH burst periods used in the numerologies. Accordingly, the UE can receive common information (e.g., RACH burst timing) and different pieces of information (e.g., RACH burst periods) from the numerologies. The UE can acquire PRACH resource configuration information of the other numerology (e.g., the second numerology) in addition to PRACH resource configuration information of the numerology (e.g., the first numerology) corresponding to the same broadcast information as a received PBCH by receiving the common information and the different pieces of information.

FIG. 12(d) illustrates a case in which PRACH resource configurations of the first numerology (Numerology 1) and the second numerology (Numerology 2) are independently determined. In this case, RACH burst periods and RACH burst timings of the first numerology Numerology1 and the second numerology Numerology2 can be freely determined according to purpose and situation.

In the case of FIG. 12(d), PRACH resource configuration information can be defined differently for the numerologies. Accordingly, a UE needs to independently receive the PRACH resource configuration information of the numerologies.

The method of configuring a PRACH resource according to whether numerologies have the same RACH burst periods and RACH burst timings when a system provides a plurality of numerologies has been described. Hereinafter, standards and parameters for selecting one of a plurality of numerologies by a UE in a system supporting a plurality of numerologies, and a method of selecting a numerology on the basis of specific important parameters will be described.
  CP length and/or subcarrier spacing of numerology
  Search space information for RAR and/or msg4
    Bandwidth information of search space and corresponding data transmission (e.g., for narrowband support)
    Transmission system for msg3 and/or msg 4 (either contention-based or contention-free access)
    Resources and necessary configuration for contention-based access
  Required minimum HARQ-ACK latency
    This may be used for RAR timing estimation as well. For example, if this is 4 msec, a minimum RAR window becomes 4-delta msec (e.g., delta=1).
    Alternatively, the gap between a PRACH and a RAR can be separately configurable.
  TTI length used for RAR transmission and/or msg4
    It may be assumed that the same TTI length is used for msg3.
    Alternatively, separate configuration for msg3 can be considered.
  Time/frequency location of PRACH
  Loaded situation
    Semi-statically, the loaded situation of a PRACH resource can also be optionally configurable. Based on the information, the UE may select a PRACH resource.
  Necessary configuration for resources of successive messages (e.g., msg 2/3/4)
  Repetition number Although only two numerologies will be described hereinbelow for convenience of description, the number of numerologies constituting a system is not limited thereto. That is, the number of numerologies constituting a system may be two or more and a UE can select one of two or more numerologies on the basis of standards (or parameters and characteristics).

<Numerology Selection According to CP Length>

It is assumed that a wireless communication system supports two numerologies, the first numerology uses a first subcarrier spacing and a PRACH preamble of the first numerology uses a format defined on the basis of X1 km. In addition, the second numerology uses a second subcarrier spacing and a PRACH preamble of the second numerology uses a format defined on the basis of X2 km. Here, a case in which X1 is greater than X2 is assumed. When a UE is located within X2 km from an eNodeB, the UE can select both the first numerology using the first subcarrier spacing and the second numerology using the second subcarrier spacing. When the UE is separated from the eNodeB by X2 km or longer, the UE can select only the first numerology.

The UE can estimate the coverage thereof through RSRP (reference signal received power). Further, the UE can determine a PRACH for which a configuration for a CP set by each PRACH resource set corresponds to a CP length required by the UE. Here, the UE can select a numerology according to latency.

When SINR (Signal-to-interference-plus-noise ratio) is satisfactory and a high data rate is not required according to the RSRP or measurement, that is, when data transmission needs to be received through a short CP length at a low rank (when low latency is required), the UE can select a PRACH resource corresponding to a short CP length. On the contrary, when the UE is less sensitive to latency and requires a high data rate, the UE can select a PRACH resource having a CP length suitable for the data rate from PRACH resources and transmit a PRACH. Although the UE may transmit the PRACH and then transmit a CP length suitable therefor to a network to select a CP length or a numerology through retransmission, the UE can preferentially perform PRACH resource selection in order to reduce latency necessary for convenience of network operation or numerology reconfiguration when the network operates other numerologies according to FDM/TDM.

Preferential PRACH resource selection is applicable to cases in which PRACH resources are different, such as eMMB (enhanced mobile broadband) and mMTC (massive Machine Type Communications). The PRACH resource set may be resources that are not used for an initial RACH procedure and are used only for a RACH procedure triggered by an SR, PDCCH order and the like after the UE is subjected to an initial access procedure. To support low latency, a RACH procedure is performed according to a normal TTI in initial access but an access procedure according to low latency can be performed in the subsequent access process.

<Numerology Selection According to Coverage>

If a UE is not aware of the coverage thereof and is not sensitive to latency, the UE can select numerologies from a PRACH resource of a numerology supporting the narrowest coverage to PRACH resources of numerologies supporting wider coverages.

It is assumed that a wireless communication system supports two numerologies, the first numerology uses a first subcarrier spacing and a PRACH preamble of the first numerology uses a format defined on the basis of X1 km. In addition, the second numerology uses a second subcarrier spacing and a PRACH preamble of the second numerology uses a format defined on the basis of X2 km. Here, a case in which X1 is greater than X2 is assumed.

Here, if a UE has no information about the coverage thereof and is not sensitive to latency, the UE can select the PRACH resource of the second numerology first. When the selected second numerology satisfies coverage conditions, the UE can perform a PRACH procedure by receiving a random access response, and it can be determined that the selected second numerology does not satisfy the coverage conditions when the UE does not receive the random access response. When the UE does not receive the random access response, the UE can select the PRACH resource of the first numerology in the subsequent operation.

On the other hand, if the UE is not aware of coverage conditions thereof and is sensitive to latency, the UE can select the PRACH resource of the second numerology to prevent time delay due to retransmission. When this method is used, collision probability of UEs sensitive to latency can be decreased by preferentially allocating UEs located within a specific coverage to corresponding PRACH resources.

<Numerology Selection According to Latency>

When a resource set is selected, a UE that requires low latency as in URLLC (Ultra Reliable Low Latency Communication) can select a PRACH resource set supporting low latency because different PRACH resource amounts and different load situations are set for respective resource sets. However, in the case of a PRACH resource set supporting low latency, a coverage problem may be generated and congestion is aggravated when RAR, msg3 and the like are transmitted.

In such a case, a UE can select other PRACH resources in a PRACH retransmission process and may select a PRACH resource having a suitable CP length and latency in a RACH procedure. The UE can select a PRACH resource set according to minimum HARQ-ACK latency supported thereby and a network can apply supportable HARQ-ACK latency from when the network transmits a random access response to the UE. When the UE selects a CP length suitable therefor, the UE may feed back a CP length suitable therefor through measurement or select the shortest CP length and repeat a RACH procedure until a suitable CP length is detected.

A UE can reconfigure a PRACH resource according to the situation thereof (i.e., according to the CP length necessary for the operation of the UE) after receiving information about a PC length supported by the system. In the case of uplink, contention-free access and contention-based access may have different CP lengths. Accordingly, the CP length used for msg3 or the like may be set differently for PRACH resource sets according to uplink transmission mechanism. For example, if a UE supports contention-based access, the UE can select a PRACH resource set with respect to contention-based access. The UE can select a CP length and a PRACH resource and transmit msg3 on the basis of the configuration of the PRACH resource set.

Figure 13A:
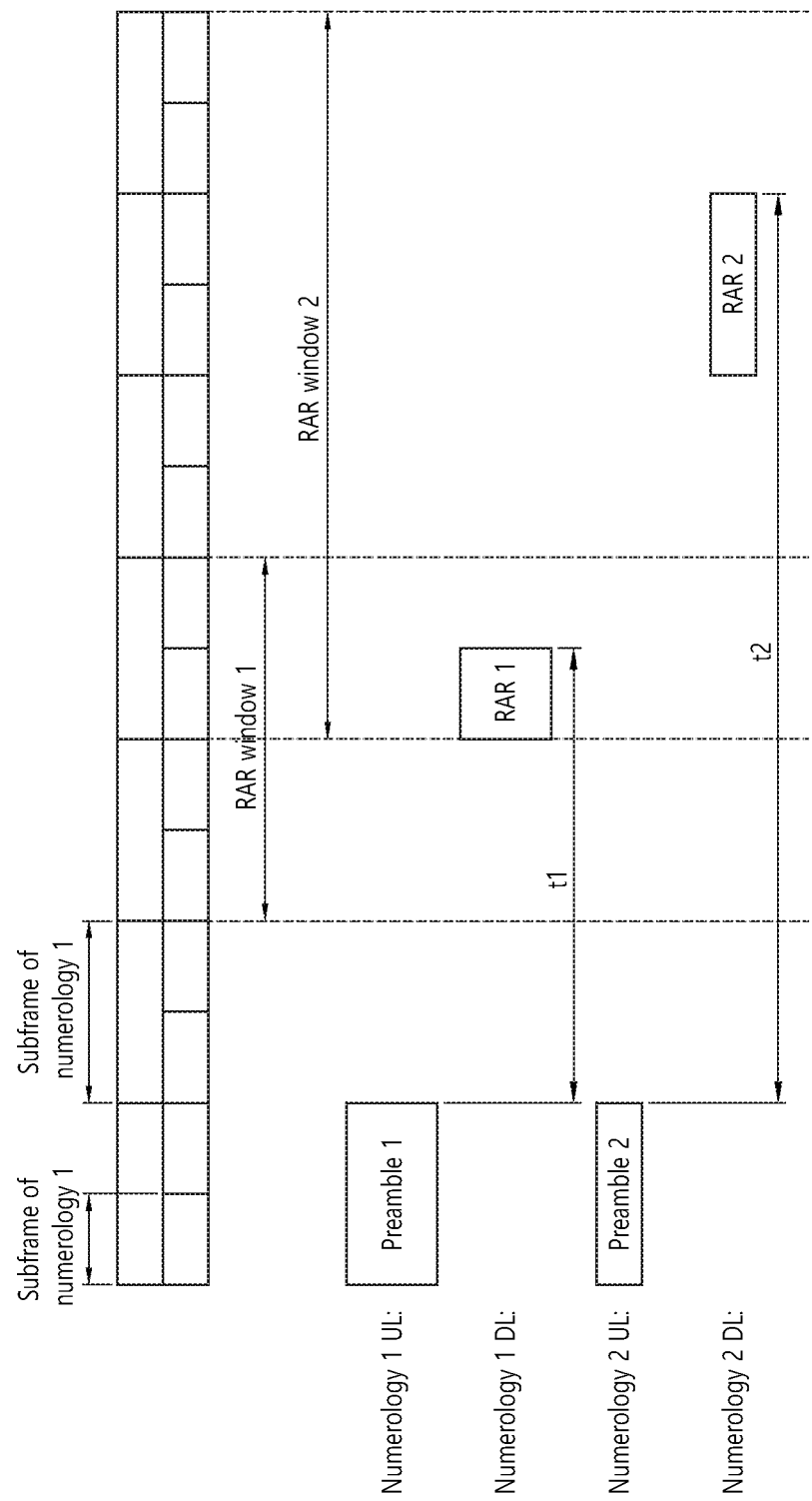

FIG. 13a Shows an Example of Selecting One of a Plurality of Resources According to Embodiments Proposed in the Present Description.

Referring to FIG. 13a, a time interval between preamble transmission and random access response may be different according to PRACH resource set configuration in different numerologies. An interval between preamble transmission and random access response can be determined as an interval corresponding to a multiple of a subframe. The interval between preamble transmission and random access response (e.g., an interval of a multiple of a subframe) may depend on an embodiment (or numerology). Alternatively, the interval between preamble transmission and random access response may be determined according to minimum HARQ-ACK delay of a PRACH resource set, and numerologies may have different time intervals even if the same interval corresponding to a multiple of a subframe is used.

According to an embodiment, each numerology can use a time interval determined as a specific value. Information about the time interval can be broadcast to UEs through cell-specific system information. When a UE intends to reduce a random access time, the UE can select a PRACH resource having a short time interval between preamble transmission and random access response.

According to an embodiment of the present invention, the time interval can be determined as a time between a point at which preamble transmission ends and a point at which random access response ends. When the time interval is determined as a time between a point at which preamble transmission ends and a point at which random access response ends, it is possible to rapidly check whether a random access response to a preamble transmitted from a UE is transmitted and thus can rapidly determine whether the random access response is retransmitted.

According to another embodiment of the present invention, the time interval can be determined as a time between a point at which preamble transmission starts and a point at which random access response ends. According to another embodiment of the present invention, the time interval can be determined as a time between a point at which preamble transmission ends and a point at which random access response starts. According to another embodiment of the present invention, the time interval can be determined as a time between a point at which preamble transmission starts and a point at which random access response starts. That is, the standard for determining the time interval can be changed according to cell-specific system information.

Although the time interval indicates a time between a point at which preamble transmission ends and a point at which random access response ends in the present description for convenience of description, the time interval is not limited thereto and the standard for the time interval can be changed as described above according to embodiments.

Referring to FIG. 13a, a wireless communication system may support two numerologies, the first numerology Numerology1 may use a first subcarrier spacing, and a time interval between a point in time at which transmission of a first preamble Preamble1 of the first numerology ends and a point in time at which a first random access response RAR1 ends may be represented as a first time t1. In addition, the second numerology Numerology2 may use a second subcarrier spacing, and a time interval between a point in time at which transmission of a second preamble Preamble2 of the second numerology Numerology2 ends and a point in time at which a random access response RAR2 ends may be represented as a second time t2.

The first time t1 is a time interval shorter than the second time t2. When a UE intends to end a random access procedure within a short time, the UE can select the second numerology Numerology2 having the first time t1 corresponding to a shorter time interval.

Figure 13B:
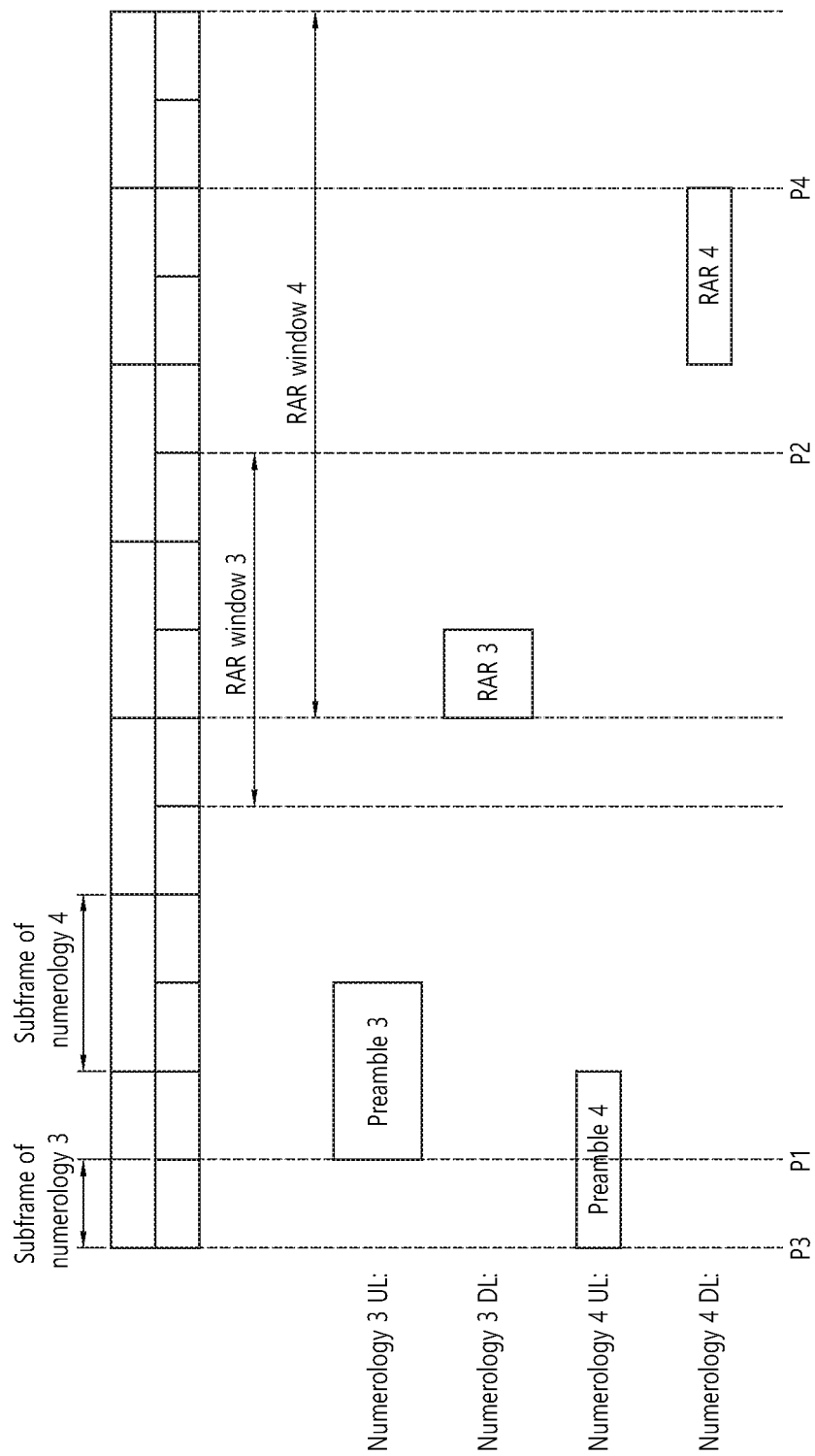

FIGS. 13b and 13c Show Examples of Selecting One of a Plurality of Resources According to Embodiments of the Present Invention.

A UE can select a numerology (or PRACH resource) on the basis of a random access response reception time.

Referring to FIG. 13b, a wireless communication system may support two numerologies, a third numerology Numerology3 may use a third subcarrier spacing, and a fourth numerology Numerology4 may use a fourth subcarrier.

A point in time at which transmission of a third preamble Preamble3 of the third numerology Numerology3 starts may be represented as a first point in time P1, a point in time at which reception of a third random access response RAR3 of the third numerology Numerology3 ends may be represented as a second point in time P2, a point in time at which transmission of a fourth preamble Preamble4 of the fourth numerology Numerology4 starts may be represented as a third point in time P3 and a point in time at which reception of a fourth random access response RAR4 of the fourth numerology Numerology4 ends may be represented as a fourth point in time P4.

Since the first point in time P1 which is a point in time at which transmission of the third preamble Preamble3 of the third numerology Numerology3 starts is behind the second point in time P2 which is a point in time at which reception of the third random access response RAR3 of the third numerology Numerology3 ends but the second point in time P2 which is a point in time at which reception of the third random access response RAR3 of the third numerology Numerology3 ends is ahead of the fourth point in time P4 which is a point in time at which reception of the fourth random access response RAR4 of the fourth numerology Numerology4 ends, a UE can select the PRACH resource corresponding to the third numerology on the basis of the point in time at which reception of a random access response ends.

Although a preamble transmission time refers to a transmission start time and a random access response reception time refers to a reception completion time in the present description for convenience of description, the present invention is not limited thereto. That is, a preamble transmission time may refer to a transmission completion time and a random access response reception time may refer to a reception start time. Further, a preamble transmission time and a random access response reception time may be independently determined.

Referring to FIG. 13c, a wireless communication system may support two numerologies, a fifth numerology Numerology5 may use a fifth subcarrier spacing, and a sixth numerology Numerology6 may use a sixth subcarrier.

A time interval between a point in time at which transmission of a fifth preamble Preamble5 of the fifth numerology Numerology5 ends and a point in time at which a fifth random access response RAR5 ends may be represented as a third time t3. In addition, a sixth numerology Numerology6 may use a sixth subcarrier spacing, and a time interval between a point in time at which transmission of a sixth preamble Preamble6 of the sixth numerology Numerology6 ends and a point in time at which a random access response RAR6 ends may be represented as a fourth time t2.

Since the third time t3 which is a time interval between a point in time at which transmission of the fifth preamble Preamble5 of the fifth numerology Numerology5 ends and a point in time at which the fifth random access response RAR5 ends is shorter than the fourth time t4 which is a time interval between a point in time at which transmission of the sixth preamble Preamble6 of the sixth numerology Numerology6 ends and a point in time at which the sixth random access response RAR6 ends, but a fifth point in time P5 which is a point in time at which the fifth random access response RAR5 of the fifth numerology Numerology5 is behind a sixth point in time P6 which is a point in time at which the sixth random access response RAR6 of the sixth numerology Numerology6, a UE can select the PRACH resource corresponding to the sixth numerology Numerology6 on the basis of the point in time at which reception of a random access response ends.

Although a random access response reception time refers to a reception completion time in the present description for convenience of description, the present invention is not limited thereto. That is, a random access response reception time may refer to a reception start time.

In addition, although a time interval refers to a time between a point at which transmission of a preamble transmission ends and a point at which a random access response ends, the present invention is not limited thereto.

Standards for selecting a PRACH resource (or numerology) by a UE have been described. When a plurality of standards for selecting a PRACH resource (or numerology) collide, a UE can select a PRACH resource (or numerology) on the basis of a standard most suitable therefor according to settings or situation.

FIG. 14a Shows an Example of Changing Resources According to an Embodiment of the Present Invention.

When a UE determines that a selected PRACH is not suitable therefor after reception of a random access response from an eNodeB, the UE can re-reselect a PRACH suitable therefor. According to an embodiment, the UE can select a PRACH resource suitable therefor on the basis of preset information and transmit a random access preamble corresponding to the selected PRACH resource to the eNodeB.

When a PRACH resource is configured per numerology in a system in which two or more numerologies coexist, the number of preamble signatures allocated for contention-free random access may be different for PRACH resources. Accordingly, collision probability of a UE that performs contention-based random access using each PRACH resource may vary.

A UE can select a numerology to be used for a PRACH procedure by comparing contention degrees of PRACH resources. For example, the UE can select a numerology on the basis of amounts of contention-free preamble signatures allocated to PRACH resources of numerologies. A base station (i.e., eNodeB) can broadcast information about a numerology having a PRACH resource to which a larger amount of contention-free preamble signatures have been allocated to the UE.

A UE sensitive to latency can select a PRACH resource of a numerology to which a larger amount of content based preamble signatures have been allocated in order to prevent retransmission due to collision. On the other hand, a UE less sensitive to latency can be configured to preferentially select a PRACH resource of a numerology having a relatively small amount of contention-based preamble signatures, and if retransmission occurs, select a numerology having a larger amount of contention-based preamble signature resources among other PRACH resources.

Here, if a UE cannot receive a random access response although the UE has selected a numerology having the largest amount of contention-based preamble signature resources, the UE cannot select a PRACH resource again and can transmit a random access preamble using the PRACH resource having the largest amount of contention-based preamble signature resources.

Referring to FIG. 14a, it is assumed that a UE is less sensitive to latency. The UE has transmitted a first preamble Preamble1 of a first numerology Numerology1 on the basis of the number of contention-free preamble signature resources but may not receive a random access response from the first numerology Numerology1 due to the influence of collision. Accordingly, the UE can transmit a second preamble Preamble2 to a second numerology Numerology2 having a smaller number of contention-free preamble signature resources than the first numerology Numerology1 and receive a second random access response RAR2 from the second numerology Numerology2 as a response to the second preamble Preamble2.

Figure 14B:
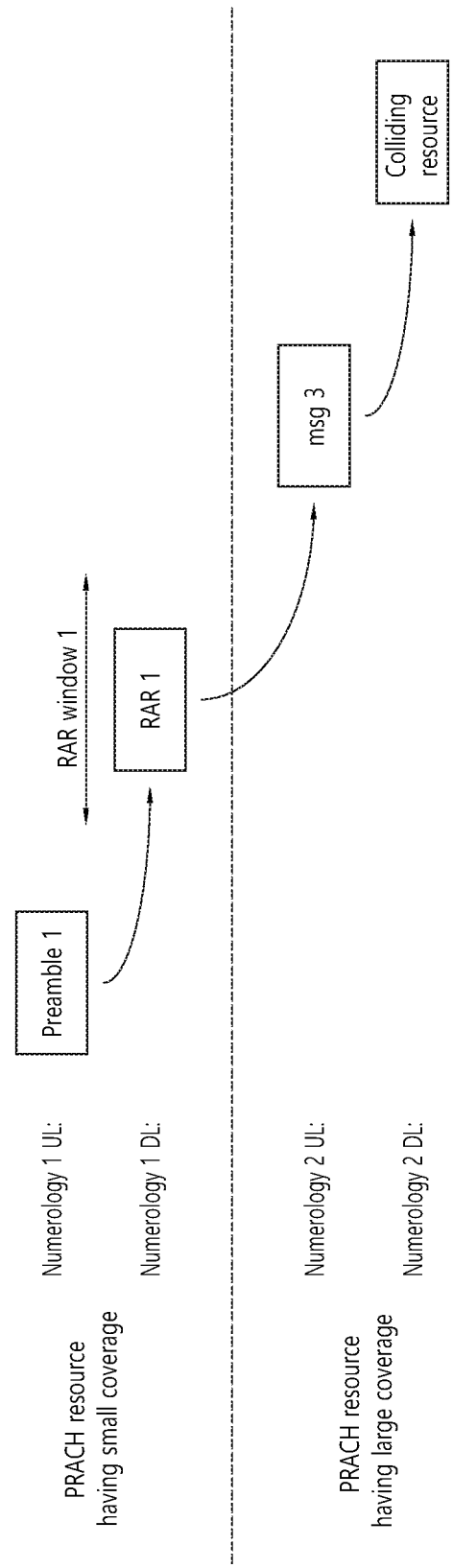

FIG. 14b Shows an Example of Changing Resources According to Another Embodiment of the Present Invention.

According to an embodiment, a UE can send a request for first configuration information about transmission of data suitable therefor to an eNodeB when transmitting a preamble to a numerology. The first configuration information may include information about the numerology. For example, the first configuration information may include information about a subcarrier spacing and a CP length of the numerology.

Upon reception of the first configuration information, the eNodeB can transmit second configuration information that is configuration information of the numerology to the UE as a response to the first configuration information. The second configuration information may be included in a random access response. The second configuration information may be applied from transmission of msg3 of the UE.

The second configuration information may include the same content as the first configuration information or different content from the first configuration information. For example, when the eNodeB accepts the request of the UE, the eNodeB can transmit the second configuration information having the same content as the first configuration information requested by the UE to the UE. On the other hand, when the eNodeB does not accept the request of the UE, the eNodeB can transmit the second configuration information having different content from the first configuration information to the UE.

The standard by which the eNodeB selects the second configuration information from a plurality of pieces of configuration information may vary according to embodiments. That is, the eNodeB can select the second configuration information according to a standard determined to be suitable for the UE according to a preset standard or embodiment.

The UE can determine whether to transmit data on the basis of the second configuration information. When the UE determines that data will be transmitted on the basis of the second configuration information, the UE can transmit msg3 on the basis of the second configuration information. On the other hand, when the UE determines that the second configuration information will not be used, the UE can send a request for configuration information about transmission of data suitable therefor to the eNodeB again. The configuration information requested again may be identical to or different from the first configuration information.

According to another embodiment, even when the UE selects a PRACH resource of a specific numerology and transmit a preamble, the eNodeB can designate another numerology such that msg3 is transmitted through the other numerology.

Referring to FIG. 14b, the eNodeB can designate another numerology in order to balance PRACH resources. For example, when an excessively large number of UEs are connected to the specific numerology than other numerologies and thus numerology distribution is required, the eNodeB can designate another numerology.

When the eNodeB determines that the other numerology is more advantageous than the specific numerology selected by the UE in terms of coverage, the eNodeB can designate the other numerology in order to correct the operation area of the UE. For example, the UE has transmitted a preamble using a PRACH resource of a numerology supporting a narrow coverage, and the eNodeB detects the preamble but may determine that coverage is insufficient under conditions such as receive power. When the coverage of a PRACH is not sufficient, coverage of msg3 transmission and PUSCH/PUCCH transmission may also be insufficient, and thus the eNodeB can instruct the UE to select a numerology supporting larger coverage.

The eNodeB can designate a numerology to be used by the UE from msg3 without transmission of a preamble and reception of a random access response through an uplink grant using a random access response. The random access response can be transmitted the numerology through which the UE transmits a preamble in order to satisfy a random access response window expected by the UE.

Referring to FIG. 14b, although a UE has selected the first numerology Numerology1 and transmitted the first preamble Preamble1 to the first numerology, an eNodeB can instruct the UE to change numerologies upon determining that the coverage of the first numerology Numerology1 is insufficient. The first numerology Numerology1 transmits a first random access preamble RAR1 to the UE as a response to the first preamble Preamble1, and the UE instructed to change numerologies can transmit msg3 to the second numerology Numerology2 having a larger coverage than the first numerology Numerology1.

Figure 15:
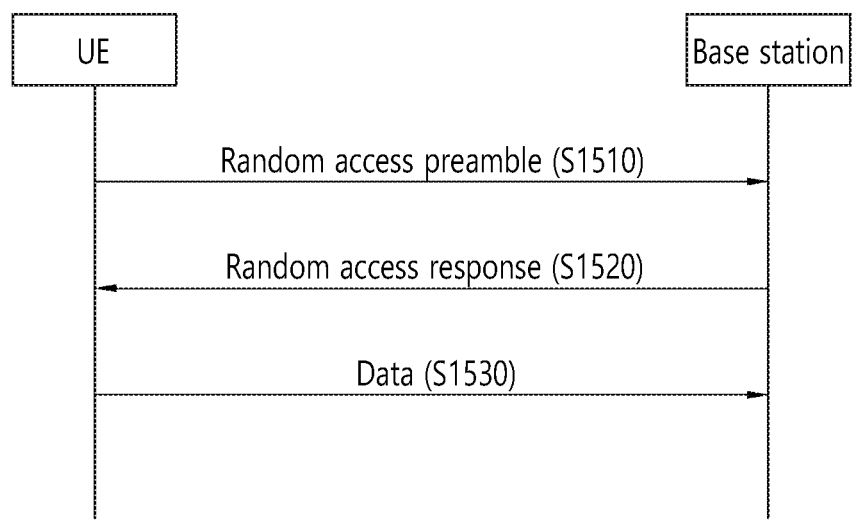
FIG. 15 shows a 2-step random access procedure.

FIG. 15 Shows a 2-Step Random Access Procedure According to Embodiments Proposed in the Present Description.

Referring to FIG. 15, a UE can reduce the number of random access processes in order to decrease latency. Compared to FIG. 8, the UE can immediately transmit data without scheduled transmission (S830) and contention resolution (840) procedures.

The UE can transmit a random access preamble in order to perform a random access procedure with an eNodeB (S1510). The eNodeB can transmit a random access response to the UE in response to the random access preamble (S1520). The UE can immediately transmit data (S1530) in response to the random access response. In this manner, an operation of the UE to transmit data without transmitting other signals in response to reception of a random access response is referred to as a 2-step random access procedure. For example, the UE can immediately transmit msg3 without transmitting the random access response to a higher layer upon reception of the random access response.

Here, "immediately" transmitting refers to transmitting data (or msg3) before 4 subframes (e.g., (n+4)-th subframe) from a subframe (e.g., n-th subframe) in which the UE receives the random access response (S1520). That is, when the subframe in which the UE receives the random access response (S1520) is the n-th subframe, the UE can transmit data (or msg3) in the (n+1)-th to (n+3)-th subframes through a 2-step random access procedure.

A TBS (transport block set) and uplink resources may be preset or configured by a higher layer such that the UE immediately transmit msg3 after reception of the random access response. The UE can transmit pre-configured data upon allocation of a PRACH resource through decoding of the random access response. Transmission of the data can be performed in the same slot in which the random access response is received or performed in a basic size (m slot size, m being a natural number) of a RACH resource.

To distinguish a UE supporting the normal 4-step random access procedure from a UE supporting the 2-step random access procedure, resources used in PRACH transmission can be identified. The resource may be identified through preamble signatures and identified in the frequency domain and/or the time domain. The eNodeB can broadcast the identified resources to UE in advance.

For example, when the resources are identified through preamble signatures, a UE performing 2-step random access can select one of preamble signatures recognized as supporting 2-step random access through the broadcast information.

Further, when the resources are identified in the frequency domain and/or the time domain, a UE performing 2-step random access can select one of preamble signatures recognized supporting 2-step random access and perform random access through a frequency and/or time resource allocated through the broadcast information.

The UE may prepare a data block when preparing transmission of the preamble in order to immediately transmit the data after reception of the random access response. Here, a parameter for generating the data block is predetermined and both the UE and the eNodeB need to know the parameter.

For example, each preamble that can be used by the UE can indicate an index corresponding to a parameter set selected by the UE from parameter sets. The eNodeB can recognize which parameter set has been used through the preamble received from the UE, and the used parameter set can be used for data transmission of the UE after reception of the random access response. The parameter set can include information about a transmission resource region, a scrambling sequence and a DMRS sequence.

When a parameter set used by the UE in the data transmission step matches a preamble index, the eNodeB can signal information about the matching to the UE in advance through higher layer signaling such as RRC signaling. Here, the information about the matching can include the value of the preamble index with respect to 2-step random access and a parameter set value matching the preamble index. Here, information that is not sensitive to latency can be transmitted through the random access response.

In the 2-step random access procedure, the eNodeB can reduce or omit transmission of information through a PDSCH, reduce the number of blind decoding operations for a PDCCH or receive data from the UE without transmitting a PDCCH. Here, information that is not transmitted among information that needs to be acquired by the UE through the PDCCH can be replaced by predefined information. When the eNodeB confirms the preamble signature of the UE that performs 2-step random access, the eNodeB can transmit only the PDCCH. The eNodeB can broadcast predefined information necessary for data transmission of the UE to the UE. The preset information can include a TBS and a modulation order.

The UE can determine the coverage thereof through RSRP measurement, determine a repetition level to be used for preamble transmission and determine the modulation order or repletion level thereof. The eNodeB can determine the size of a resource to be used or a modulation order through the preamble repetition level of the UE.

When the resources are identified through preamble signatures, information transmitted through the PDCCH can include an identifier corresponding to a preamble, and the identifier may be an RNTI (Radio Network Temporary Identifier). The RNTI may be included in a PRACH resource or may identify a resource of each preamble through which a PDCCH is transmitted. When the UE confirms that the PDCCH has been transmitted thereto, the UE can perform data transmission.

In addition, when the resources are identified in the frequency domain and/or the time domain, a random access response can be transmitted per UE. A region in which a PDCCH is received can be divided for preambles through FDM/TDM. For example, with respect to candidates for a search space in which a random access response can be transmitted, the number of available candidates can be divided for preamble indexes or time domain resources and/or frequency domain resources of the search space can be set differently. When the number of UEs that simultaneously transmit PRACHs is small, the method of identifying the resources in the frequency domain and/or the time domain may be effective.

However, when the number of UEs that simultaneously transmit PRACHs is large, a random access response can deliver information about whether the random access response is separately transmitted per preamble index or commonly transmitted for all preambles through higher layer settings or broadcast. If the random access response is separately transmitted per preamble index, the random access response can be transmitted in a control channel. That is, the control channel can carry the random access response per preamble index without scheduling a PDSCH in which the random access response is transmitted. The preamble index can be included in a payload.

The UE may transmit information about the ID thereof along with data in order to avoid collision. The information about the ID of the UE may be a temp C-RNTI or a UE ID. The information about the ID of the UE may be information about a preamble index.

When the information about the ID of the UE is information about a preamble index, the preamble index can be used for temporary C-RNTI and final RNTI can be transmitted through a feedback corresponding to msg4. The final RNTI can be obtained by adding only a bit to information that is being used, such as data and CRC. This is for the purpose of reducing the number of blind decoding operations necessary when a UE ID is represented, and thus latency can be reduced and the amount of computations in the eNodeB can be decreased. The UE ID can be represented by masking CRC with UE_ID. Accordingly a payload may not be additionally generated.

The eNodeB can receive data and the information about the UE (UE_ID) from the UE and transmit ACK/NACK in response thereto. The ACK/NACK can be identified according to UE_ID. The ACK/NACK can include information about UE_ID. The information about UE_ID can be transmitted by masking UE_ID with ACK/NACK. Accordingly, the amount of resources required to transmit the information about UE_ID and ACK/NACK can be reduced.

According to embodiments, the information about UE_ID and ACK/NACK can be represented by independent bits. Further, the UE can select frequency and/or time resources on the basis of the UE_ID and monitor ACK/NACK in the selected frequency/time resources.

When the ACK/NACK is identified by the UE_ID, the UE can consider the following three cases according to information included in the ACK/NACK.

(1) ACK reception: it is confirmed that data has been correctly transmitted.

(2) NACK reception: it is confirmed that the eNodeB recognizes presence of the UE but fails in data transmission.

(3) No received signal: it is confirmed that the eNodeB does not recognize presence of the UE.

In the case of (1), the UE need not perform further operation because the data transmitted therefrom has been successfully received. In the case of (2), the UE can retransmit data without a random access procedure because the eNodeB recognizes presence of the UE in order to prevent latency occurrence due to additional random access. Here, frequency and/or time resources to be used by the UE for data retransmission can be determined on the basis of the UE_ID. In the case of (3), the UE can restart the random access procedure from the beginning.

Figure 16:
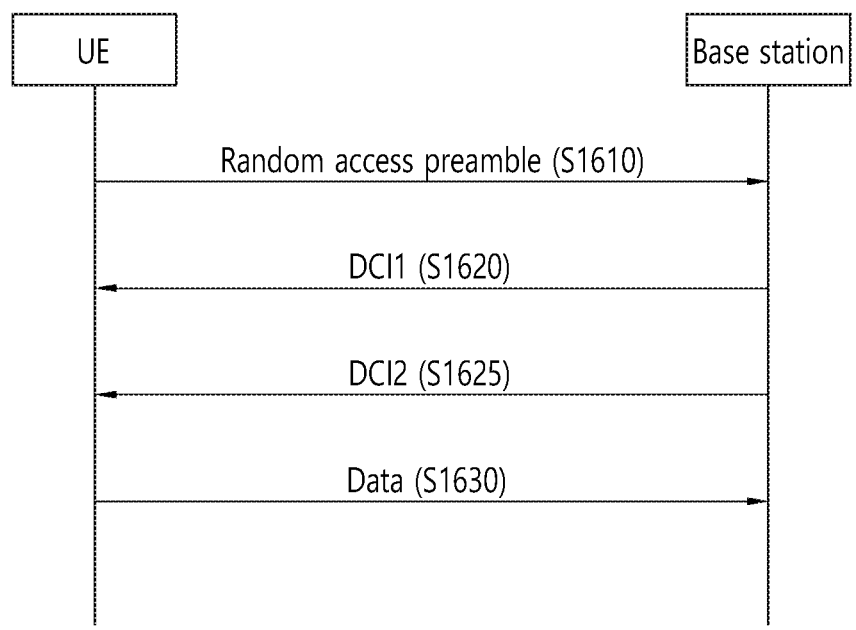
FIG. 16 shows a 2-step random access procedure when a random access response is composed of 2-step DCI.
Figure 17:
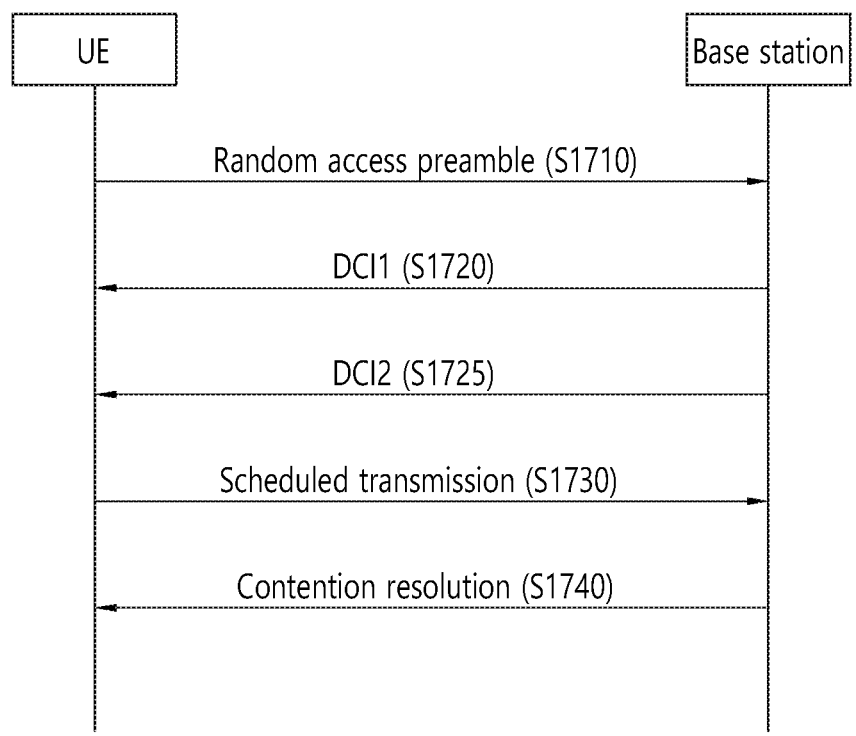
FIG. 17 shows a contention-based random access procedure when a random access response is composed of 2-step DCI.

FIG. 16 Shows a 2-Step Random Access Procedure when a Random Access Response is Composed of 2-Step DCI and FIG. 17 Shows a Contention-Based Random Access Procedure when a Random Access Response is Composed of 2-Step DCI.

Referring to FIGS. 16 and 17, a method by which a UE performs a random access procedure with an eNodeB is disclosed. 2-step random access conforms to the description in FIG. 15.

Here, 2-step DCI (downlink control information) may refer to a case in which a UE receives DCI classified into first DCI and second DCI from an eNodeB in a random access procedure.

Referring to FIG. 16, the UE can transmit a random access preamble to an eNodeB in order to perform random access (S1610). The eNodeB can transmit the first DCI and the second DCI to the UE in response to the random access preamble (S1620 and S1625). The first DCI and the second DCI may include PDSCH scheduling information including a random access response (RAR).

The UE can transmit data to the eNodeB in response to the random access response (RAR) (S1630).

Referring to FIG. 17, a UE can transmit a random access preamble to an eNodeB in order to perform random access as in FIGS. 8 and 16 (S1710). The eNodeB can transmit the first DCI and the second DCI to the UE in response to the random access preamble (S1720 and S1725). The first DCI and the second DCI may include PDSCH scheduling information including a random access response (RAR). The UE can perform scheduled transmission to the eNodeB in response to the random access response (RAR) (S1730). The UE can wait for an instruction of the eNodeB for contention resolution (S1740).

The first DCI may include information about generation of data. Further, the first DCI may include information about a method of transmitting the data. The first DCI may include information about presence or absence of a response to each preamble index. Accordingly, when the first DCI indicates presence of a response of the eNodeB, the UE can immediately transmit data (or msg3) to the eNodeB using predefined resources. Each preamble can include information about TA (timing alignment) for smooth transmission of the data (msg3), and a random access response used for 2-step random access may include the information about TA and a preamble index.

According to an embodiment, when the UE is sensitive to latency, the UE can receive the first DCI and then immediately transmit the data (msg3) without reading the second DCI. In such a case, the UE may have acquired information necessary to transmit the data (or msg3). According to an embodiment, when the UE receives only the first DCI and transmit the data, the UE can transmit the data in the same slot in which the first DCI is received.

The second DCI can trigger transmission of the data. The first DCI and the second DCI can be distinguished from each other according to resources or using RNTI.

When a PRACH resource selected by the UE needs to be changed, the first DCI may include information about whether the PRACH resource can be changed. That is, when the UE sends a request for PRACH resource change to the eNodeB and the eNodeB approves the PRACH resource change, the first DCI includes information indicating that the PRACH resource change has been approved. Here, the second DCI may include configuration information necessary for PRACH change. Accordingly, the UE needs to read the second DCI in this case.

If the PRACH change is not approved, the first DCI includes information indicating that the PRACH change is not approved and the UE may not read the second DCI on the basis of the first DCI. Here, the UE can continuously perform the existing random access procedure or attempt to change the PRACH resource to another PRACH resource.

When the UE monitors 2-step DCI, the UE can also monitor a PDCCH order in the same manner as that for 2-step DCI. Here, the first DCI may have the same format size as that of another DCI that share the same search space in order to prevent the number of blind decoding operations from increasing. Here, the first DCI can include a 1-bit flag indicating information about a PDCCH order.

When the first DCI refers to information about a PDCCH order, the part of the first DCI other than the 1-bit flag may include configuration information about the second DCI. For example, the part of the first DCI other than the 1-bit flag may include scheduling information in terms of time/frequency of the second DCI. When the second DCI takes a form like a PDSCH, the first DCI may include information necessary to decode MCS and RV.

The first DCI can include information indicating whether the UE needs to read the second DCI. For example, when the first DCI indicates that the UE needs to perform a RACH procedure in a cell in which the UE comps on, the UE may not read the second DCI because the UE does not require additional configuration information about RACH. If the UE intends to perform a RACH procedure with a cell other than the cell in which the UE receives PDCCH information, the eNodeB can transmit RACH configuration information to the UE through the second DCI.

The above description can be realized by hardware.

Figure 18:
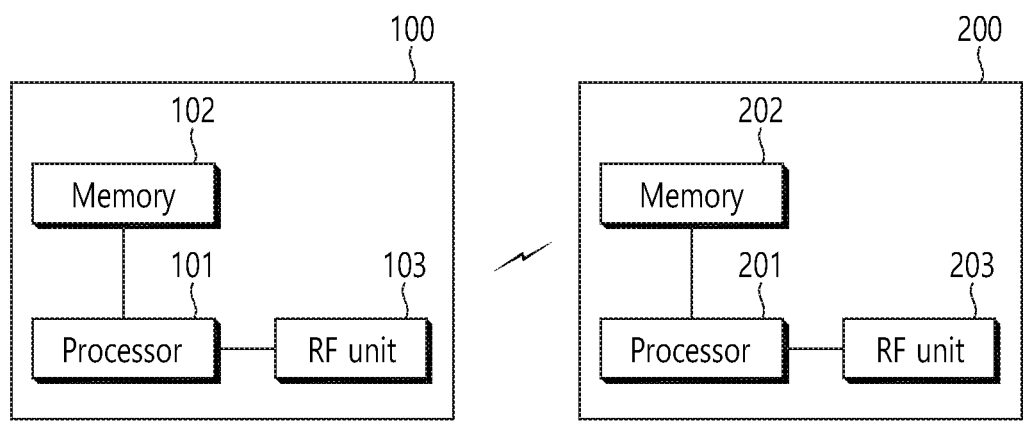
FIG. 18 is a block diagram showing a wireless communication system that implements an embodiment proposed in the present description.

FIG. 18 is a Block Diagram Showing a Wireless Communication System to Implement an Embodiment of the Present Invention.

The base station 200 a processor 201, memory 202, and an RF unit 203. The memory 202 is connected to the processor 201 and configured to store various information used for the operations for the processor 201. The RF unit 203 is connected to the processor 201 and configured to send and/or receive a radio signal. The processor 201 implements the proposed functions, processed, and/or methods. In the described embodiments, the operation of the eNodeB may be implemented by the processor 201.

A wireless device 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the wireless device may be implemented by the processor 101.

The processor may include Application-Specific Integrated Circuits (ASICs), other chipsets, logic circuits, and/or data processors. The memory may include Read-Only Memory (ROM), random access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of performing random access by a user equipment (UE), the method comprising:
    selecting, by the UE, a first resource among a plurality of resources for a physical random access channel (PRACH) based on at least one of coverage set for each of the plurality of resources or latency required by the UE,
    wherein the plurality of resources being present per numerology, and
    wherein the numerology is defined based on a cyclic prefix (CP) length and a subcarrier spacing; and
    transmitting, by the UE, the PRACH on the first resource through a first numerology, based on that the first resource is related to the first numerology.

2. The method according to claim 1, wherein the first resource is selected based on an earliest PRACH transmission completion time or an earliest reception of a random access response to PRACH transmission.

3. The method according to claim 1, wherein the first resource is selected based on a resource having a large amount of contention-based preamble signatures among the plurality of resources.

4. The method according to claim 1, further comprising:
    selecting, by the UE, a second resource from the plurality of resources, based on that a random access response to the PRACH is not received; and
    retransmitting the PRACH through a second numerology related to the second resource.

5. The method according to claim 1, further comprising:
    receiving a physical downlink control channel (PDCCH) order from a base station,
    wherein the PDCCH order includes information about related to selection of the first resource.

6. The method according to claim 1, further comprising:
    receiving a random access response to the PRACH through the first numerology,
    wherein the PRACH includes first configuration information related to a resource suitable for the UE, and
    wherein the random access response includes second configuration information related to the resource as a response to the first configuration information; and
    transmitting uplink data through the second numerology based on the second configuration information.

7. The method according to claim 6, further comprising:
    receiving, by the UE, downlink control information (DCI) for reception of the random access response,
    wherein the DCI includes first DCI and second DCI, and
    wherein the first DCI includes information about related to generation of the uplink data, and the second DCI triggers transmission of the generated uplink data.

8. The method according to claim 6, further comprising:
    receiving, by the UE, downlink control information (DCI) for reception of the random access response,
    wherein the DCI includes first DCI and second DCI,
    wherein the first DCI includes information related to whether a PRACH resource can be changed, and the second DCI includes configuration information necessary for PRACH resource change, and
    wherein the second DCI is not read by the UE, based on that the PRACH resource change is not approved.

9. A user equipment (UE) performing random access, the UE comprising:
    a transceiver; and
    a processor operatively coupled to the transceiver,
    wherein the processor is configured to:
    select a first resource among a plurality of resources for a physical random access channel (PRACH) based on at least one of coverage set for each of the plurality of resources or latency required by the UE,
    wherein the plurality of resources being present per numerology, and
    wherein the numerology is defined based on a cyclic prefix (CP) length and a subcarrier spacing; and
    control the transceiver to transmit the PRACH on the first resource through a first numerology, based on that the first resource is related to the first numerology.

* * * * *